(12) United States Patent
Gara et al.

(10) Patent No.: US 7,836,260 B2
(45) Date of Patent: Nov. 16, 2010

(54) LOW COMPLEXITY SPECULATIVE MULTITHREADING SYSTEM BASED ON UNMODIFIED MICROPROCESSOR CORE

(75) Inventors: Alan G. Gara, Mount Kisco, NY (US); Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/147,914

(22) Filed: Jun. 27, 2008

(65) Prior Publication Data

US 2008/0263280 A1 Oct. 23, 2008

Related U.S. Application Data

(63) Continuation of application No. 11/351,830, filed on Feb. 10, 2006, now Pat. No. 7,404,041.

(51) Int. Cl.
*G06F 12/00* (2006.01)
(52) U.S. Cl. ....................................... 711/137
(58) Field of Classification Search ........................ None
See application file for complete search history.

(56) References Cited

U.S. PATENT DOCUMENTS

| | | | |
|---|---|---|---|
| 6,704,841 | B2 | 3/2004 | Chaudhry et al. |
| 7,216,202 | B1 | 5/2007 | Chaudhry et al. |
| 7,269,717 | B2 | 9/2007 | Tremblay et al. |
| 7,523,266 | B2 * | 4/2009 | Chaudhry et al. ........... 711/141 |
| 2002/0046324 | A1 | 4/2002 | Barroso et al. |
| 2005/0144602 | A1 * | 6/2005 | Ngai et al. .................. 717/151 |
| 2005/0198627 | A1 * | 9/2005 | Du et al. ..................... 717/160 |
| 2005/0216705 | A1 * | 9/2005 | Shibayama et al. ......... 712/216 |
| 2007/0174555 | A1 * | 7/2007 | Burtscher et al. ........... 711/137 |
| 2007/0192540 | A1 | 8/2007 | Gara et al. |

OTHER PUBLICATIONS

Marcuello, et al., Thread Partitioning and Value Prediction for Exploring Speculative Thread-Level Parallelism: © 2004 IEEE, pp. 114-125.
Sarangi, et al., "ReSlice: Selective Re-Execution of Long-Retired Misspeculated Instructions Using Forward Slicing", © 2005 IEEE, pp. 1-12.
Tsai, et al., "The Superthreaded Processor Architecture", © 1999 IEEE, pp. 861-902.
Whaley, et al., "Heuristics for Profile-driven Method-level Speculative Parailelization", © 2005 IEEE, pp. 1-10.

* cited by examiner

*Primary Examiner*—Brian R Peugh
(74) *Attorney, Agent, or Firm*—Scully, Scott, Murphy & Presser, P.C.; Daniel P. Morris, Esq.

(57) ABSTRACT

A system, method and computer program product for supporting thread level speculative execution in a computing environment having multiple processing units adapted for concurrent execution of threads in speculative and non-speculative modes. Each processing unit includes a cache memory hierarchy of caches operatively connected therewith. The apparatus includes an additional cache level local to each processing unit for use only in a thread level speculation mode, each additional cache for storing speculative results and status associated with its associated processor when handling speculative threads. The additional local cache level at each processing unit are interconnected so that speculative values and control data may be forwarded between parallel executing threads. A control implementation is provided that enables speculative coherence between speculative threads executing in the computing environment.

19 Claims, 14 Drawing Sheets

LOW COMPLEXITY SPECULATIVE MULTITHREADING SYSTEM BASED ON UNMODIFIED MICROPROCESSOR CORE

CROSS-REFERENCE TO RELATED APPLICATIONS

The present application is a continuation application of U.S. patent Ser. No. 11/351,830, filed Feb. 10, 2006, now U.S. Pat. No. 7,404,041 which is based on applicants' commonly-owned, U.S. patent application Ser. No. 11/351,829 filed on Feb. 10, 2006, now U.S. Pat. No. 7,350,027 and entitled ARCHITECTURAL SUPPORT FOR THREAD LEVEL SPECULATIVE EXECUTION, the contents and disclosure of which is incorporated by reference as if fully set forth herein.

BACKGROUND OF THE INVENTION

1. Field of the Invention

The present invention generally relates to microprocessor and multiprocessor architectures and, more particularly, to thread-level speculative processor execution for achieving high performance and speeding up sequential applications.

2. Description of the Prior Art

As increasing numbers of smaller and faster transistors can be integrated on a single chip, new processors are designed to use these transistors effectively to increase performance. The arising challenge is to find the most effective way to put these transistors to use. Currently, most computer designers opt to use the increasing transistor budget to build ever bigger and more complex uniprocessors. Another possibility is to place large amounts of memory on the chip. Alternatively, multiple processor cores can be placed on a single chip. The later approach is called chip multiprocessor (CMP) design.

Performance improvements using a single complex processor is typically achieved by exploiting ILP (instruction level parallelism), i.e., by finding non-dependent instructions in a program sequence which are then executed at the same time. However, the possible performance gain by exploiting IPL is limited due to the finite amount of ILP present in any particular application sequence.

Placing multiple smaller processor cores on a single chip is attractive because a single, simple processor core is less complex to design and verify. This results in less costly and complex verification process as a once verified module—the processor—is repeated multiple times on a chip. Each processor core on a multiprocessor is much smaller than a competitive uniprocessor, minimizing the core design time. In addition, keeping design partitions small—like a single processor core in a CMP—design tools can handle processor complexity much more easily, compared to competitive complex uniprocessors. However, many important existing applications are written for uniprocessors, and it is a non-trivial task to convert uniprocessor applications into multiprocessor ones. For this, sequential programs have to be explicitly broken into threads and synchronized properly. So far, parallelizing compilers have had only limited success at automatically handling these tasks.

Speculative multithreaded processors represent a possible solution of these difficulties offering high potential performance improvement. A speculative multithreaded processor consists logically of replicated processor cores that cooperatively perform the parallel execution of a sequential program. The sequential program is divided into chunks called speculative threads, and these threads are executed on processor cores concurrently and speculatively. This approach for performance improvement by exploiting coarse-grain parallelism in addition or instead of fine-grain parallelism (e.g., ILP) is called thread level speculation (TLS). In the thread level speculation approach, sequential programs are divided into speculative threads which are then executed concurrently on processor cores. Ideally, there are no data and/or control dependences between the threads, but being parts of the same sequential program, speculative threads are both data and control dependent. The data flow between speculative threads in one direction only—from sequentially older threads to younger ones. (Thus, data used in a younger speculative thread can be a result calculated in an older thread.) To ensure that each program executes the same way that it did on a uniprocessor, hardware must track all inherited dependences. When a younger thread in a sequence causes a true dependence violation, the hardware must ensure that the misspeculation is detected, and the misspeculated thread has to re-execute with the correct data.

To support speculation, a multiprocessor architecture for thread level speculation has to fulfill the following requirements: 1) it has to maintain a notion of the relative order of the threads—i.e., know which thread is executed before some other thread in a sequential program; 2) it has to forward data between parallel threads, or predict data; 3) it has to support mechanism for dependency violation detection—to detect if a read operation has occurred too early; 4) it has to safely discard speculative thread once a dependency violation is detected; 5) it has to commit speculative writes in proper order—only after making sure that this thread would have been executed the same way in a sequential execution; and, 6) it has to re-execute the misspeculated threads with proper data.

A goal of using speculative multithreading is to exploit distant parallelism which can reach significant levels as shown by Ebcioglu et al., "Optimizations and Oracle Parallelism with Dynamic Translation", Micro 32, Haifa, Israel, 1999. Thus, it would be highly desirable to enable general uniprocessor applications to efficiently execute on CMP architectures by providing a simple, effective way to parallelize the applications.

Hardware support for thread-level speculation is promising, because it eliminates the need for programmers to explicitly divide their original program into independent threads. One such scheme is described for the Hydra CMP system in Hammond et al., entitled "The Stanford Hydra CMP", IEEE Micro Magazine, 2000. Thread-level speculation takes the sequence of instructions run during an existing uniprocessor program and breaks it into a sequenced group of threads that may be run in parallel on a multiprocessor. To ensure that each program executes the same way that it did originally, hardware must track all inter-thread dependencies. When a "later" thread in the sequence causes a true dependence violation by reading data too early, the hardware must ensure that the misspeculated thread—or at least the portion of it following the bad read—re-executes with the proper data. This is a considerably different mechanism from the one used to enforce dependencies on conventional multiprocessors. There, synchronization is inserted so that threads reading data from a different thread will stall until the correct value has been written. This process is complex because it is necessary to determine all possible true dependencies in a program before synchronization points may be inserted. Speculation allows parallelization of a program into threads even without prior knowledge of where true dependencies between threads may occur. All threads simply run in parallel until a true dependency is detected while the program is executing. This greatly simplifies the parallelization of programs because it eliminates the need for human programmers or compilers to statically place synchronization points into programs by hand or at compilation. All places where synchronization would have been required are simply found dynamically when true dependencies actually occur. As a result of this advantage, uniprocessor programs may be obliviously parallelized in a speculative system. While conventional parallel programmers must constantly worry about maintaining program correctness, programmers parallelizing code for a speculative system can focus solely on achieving maximum performance. The speculative hardware will ensure that the parallel code always performs the same computation as the original sequential program. Since parallelization by speculation dynamically finds parallelism among program threads at runtime, it does not need to be as conservative as conventional parallel code. In many programs there are many potential dependencies that may result in a true dependency, but where dependencies rarely if ever actually occur during the execution of the program. A speculative system may attempt to run the threads in parallel anyway, and only back out speculative execution of the later thread if a dependency actually occurs. On the other hand, a system dependent on synchronization must always synchronize at any point where a dependency might occur, based on a static analysis of the program, whether or not the dependency actually ever occurs at runtime.

A number of multiprocessor architectures with support for thread level speculation have been proposed. In several of these architectures, a program is chopped into threads by the compiler during the compilation time, such as in a multiscalar processor as proposed in the reference to G. S. Sohi, et al. entitled "Multiscalar Processors", 27$^{th}$ International Symposium on Computer Architecture (ISCA-22), 1995, or as in a superthreaded architecture or trace processor. In other approaches, hardware dynamically forms the threads during the run time, such as in the Dynamic Multithreaded Processor and "Clustered Speculative Multithreaded Processors", International Conference on Supercomputing 1999 by P. Marcuello and A. Gonzales. All of these architectures require significant changes on the processor core or/and on the L1 and/or L2 level caches to support thread level speculation. These changes include at least one of the following: 1) provision of means for registers forwarding between processors; 2) the addition of new fields in one or more caches to distinguish speculative vs. non-speculative values; 3) a modified processor interface to allow communication of speculative values; and 4) a change of speculation status for the processor. By requiring significant changes to the processor core and/or to the memory nest to enable thread level speculation, existing architectures cannot take advantage of the increased performance potential which TLS offers. To support thread level speculation on an existing processor, the processor core would need massive re-design and complete re-verification process. Similarly for the memory nest, re-design and verification effort makes it prohibitive, or at least very expensive, for already existing cores and system.

Maria Jesus Garzaran, Milos Prvulovic, Jose Maria Llaberia, Victor Vinals, Lawrence Rauchwerger, and Josep Torrellas, "Tradeoffs in Buffering Memory State for Thread-Level Speculation in Multiprocessors", 9th International Symposium on High-Performance Computer Architecture (HPCA), February 2003, provides a survey of methods for state buffering.

Kranich and Christie's "Method and mechanism for speculatively executing threads of instructions", U.S. Pat. No. 6,574,725, describes a master/slave mechanism for executing subordinate (slave) threads on a second processor under control of a first master processor. This is significantly less flexible than the previously described approach which separates a program into a sequence of threads. The cited patent does not require state buffering, or thread re-start as the model does not support coherent speculative multithreading.

The cited works all require modifications to a microprocessor used in a speculatively multithreading system. Alas, due to the cost of building microprocessors, it is desirable to reuse existing cores. Thus, what is needed is a method and apparatus for proving thread control and state buffering with dependence violation logic working in conjunction with cores having been designed without support for multiprocessing.

It would be highly desirable to provide a system and method which would enable thread level speculative execution on existing processors and memory systems without requiring costly changes to the processor core or existing cache hierarchy.

It would be highly desirable to provide a method and apparatus for supporting thread-level speculation support on an unmodified pre-existing processing core thus enabling low complexity speculative multi-threading by a combination of hardware and software components.

SUMMARY OF THE INVENTION

The present invention is directed to a method and apparatus for providing thread-level speculation support on unmodified pre-existing processing core designs. In accordance with die present invention, low complexity speculative multi-threading is provided by a combination of hardware and software including:

hardware primitives, such as custom queues to aid in multithread scheduling, used to communicate by the software component implemented using low-latency interfaces, such as, including but not limited to, those based on a (Device Control Register) (DCR)-interface, or a memory-mapped I/O interface;

an improved cache apparatus providing for the tracking of speculative accesses between multiple cores executing in a multi-core multithreading system;

novel notification system to report violations of thread sequential ordering rules; and software utilizing said (core-external) hardware primitives to create, restart and kill threads in response to requests communicated using said custom queues and notification mechanisms.

The present system provides means for thread control, and specifically support for thread creation, thread initiation (thread dispatch), thread re-start in response to notification from a speculative coherence control unit that dependence constraints have been violated, instructing such state buffering means associated with speculative coherence control unit to discard speculatively generated state, and thread commit when a thread is complete, and instructing the state buffering logic to commit the speculatively generated results upon non-detection of coherence violation when the thread becomes the non-speculative thread.

Thus, according to the invention, there is provided an apparatus, method and computer program for supporting thread level speculative execution in a computing environment having multiple processing units adapted for concurrent execution of threads in speculative and non-speculative modes, each processing unit having a cache memory hierarchy of caches operatively connected therewith. The apparatus comprises:

an additional cache level local to each processing unit for use only in a thread level speculation mode, each additional cache for storing speculative results and status associated with its associated processor when handling speculative threads;

a means for interconnecting each additional cache level for forwarding speculative values and control data between parallel executing threads; and a control means for enabling speculative coherence between speculative threads executing in said computing environment.

According to one aspect of the invention, the method for supporting thread level speculative execution in a computing environment having multiple processing units adapted for concurrent execution of threads in speculative and non-speculative modes, with each processing unit having a cache memory hierarchy of caches operatively connected therewith, comprises:

providing an additional cache level local to each said processing unit for use only in a thread level speculation mode, each said additional cache for storing speculative results and status associated with its associated processor when handling speculative threads;

interconnecting said additional cache levels to enable forwarding of speculative values and control data between parallel executing threads at said processing units; and enabling speculative coherence between speculative threads executing in said computing environment.

The fundamental operations of speculative multithreading performed by the apparatus of the present invention include:

Initiating the start of a thread on another processor core;

Checking whether dependencies have been violated by threads executing speculatively;

Terminating and restarting threads which have violated dependences, and discarding state generate during the incorrect execution; and, Committing the results of a thread that has completed execution successfully, after all previous threads have committed successfully.

In one embodiment, the control means includes a speculative coherence control unit that performs the following tasks for a processor in the speculatively multithreaded system in accordance with the present invention:

Identifying when a new thread is being started, and initiate tracking of memory traffic for the new thread.

Tracking cache lines maintained in L1 data caches, and identifying whether a speculative thread has performed an access in violation of speculative multithread order.

Identifying if a processor is executing the "head tread", i.e., a non-speculative thread, or one of one or more speculative threads.

Re-starting one or more threads if a violation has been identified, and ensuring correct use of input values for restarted thread.

Committing results in-order when a thread has completed successfully; and,

Promoting the next speculative thread into the "head" thread.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
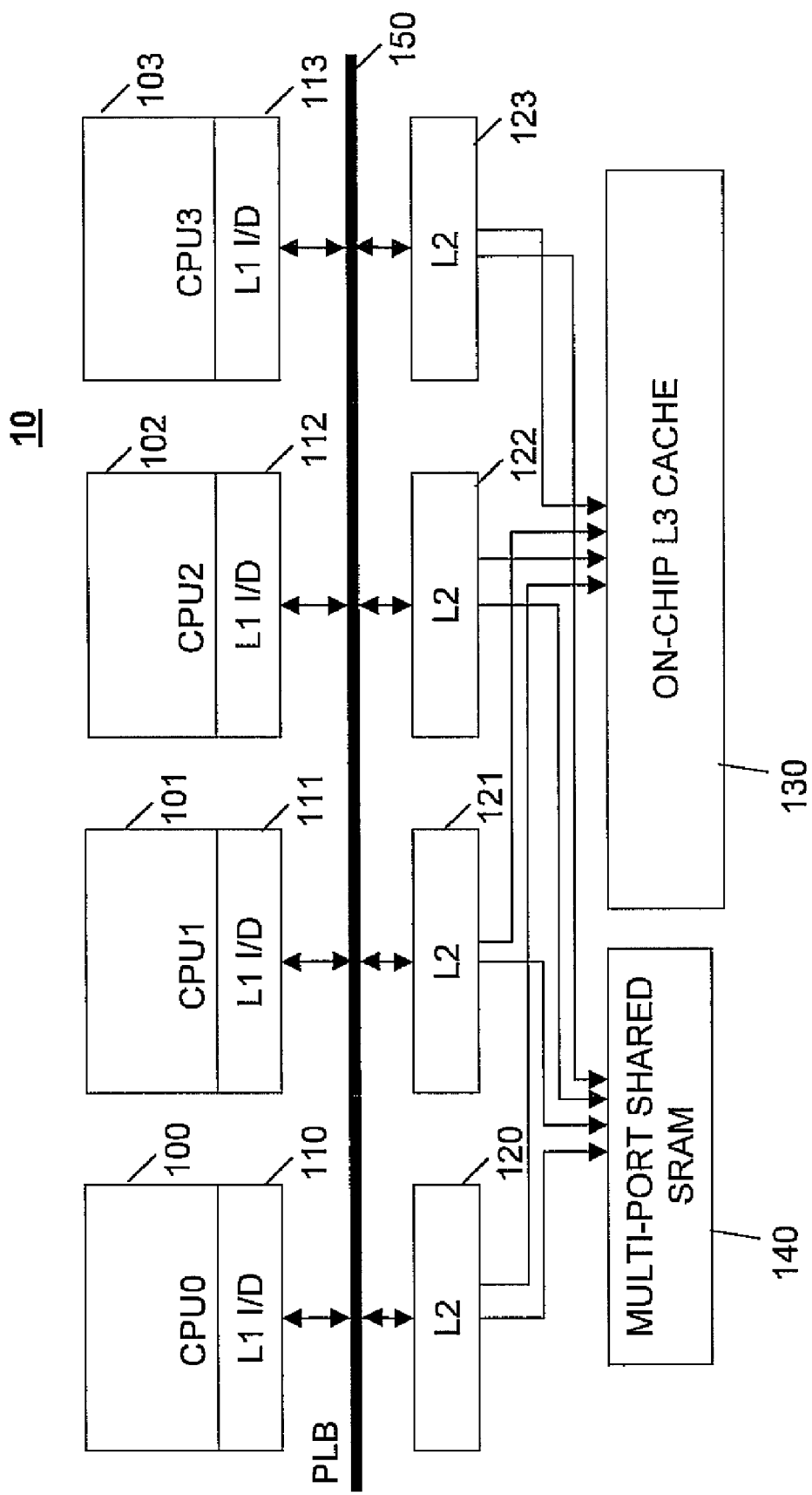
FIG. 1 is a circuit block diagram depicting a base multiprocessor architecture without the support for thread level speculation.

With reference to the accompanying drawings, FIG. 1 illustrates a schematic diagram of the overall base architecture of the multiprocessor system 10 without the support for thread level speculation. The system is composed of four identical processor cores labeled CPU0 to CPU3, labeled 100-103, respectively, each with associated local L1 level data and instruction caches, labeled 110-113, respectively, and their associated L2 caches 120-123, respectively. The system's L3 cache 130 is shared and can be implemented on-chip or off-chip. In the preferred embodiment, the processor cores 100-103 are PowerPC cores such as PPC440 or PPC405, but any other processor core can be used without departing from the scope of this invention. The processor cores 100-103 are interconnected by a processor local bus 150. In addition, the architecture also includes a shared multi-ported SRAM 140.

Figure 2:
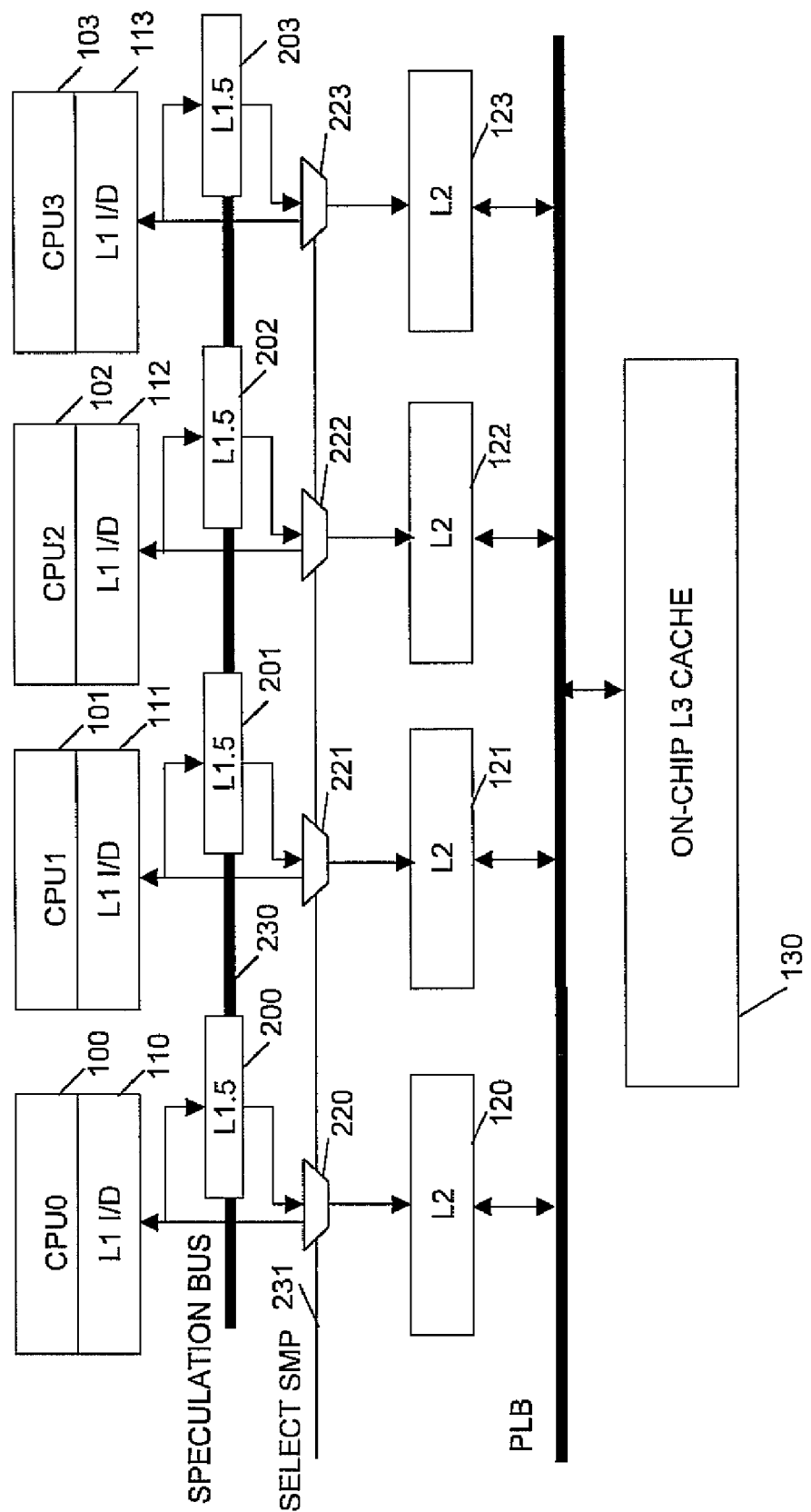
FIG. 2 is a circuit block diagram depicting a preferred embodiment of the invention with the added support for speculation.
Figure 3A:
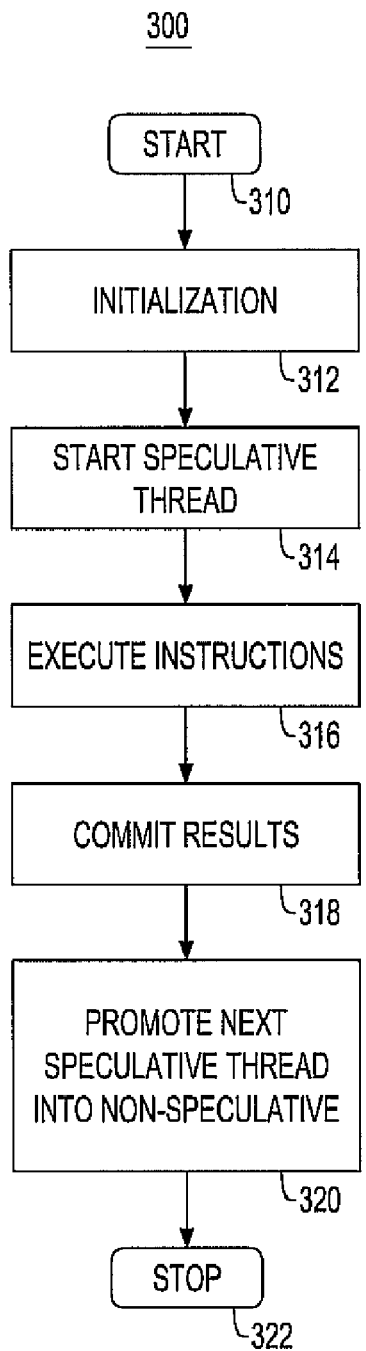
FIGS. 3(a)-3(d) illustrate a flow chart depicting the flow control for starting, executing, status changing and stopping of the threads in the embodiment of the invention depicted in FIG. 2.
Figure 3B:
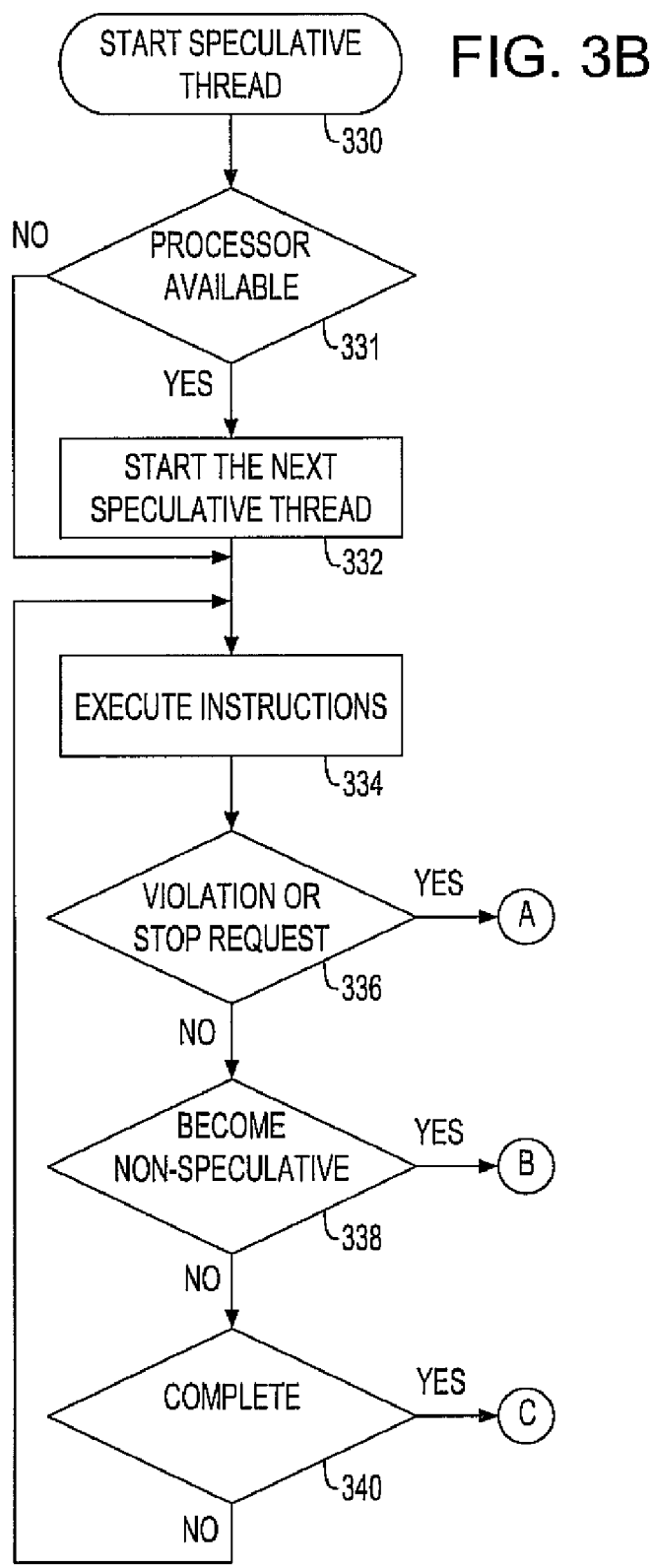
Figure 3C:
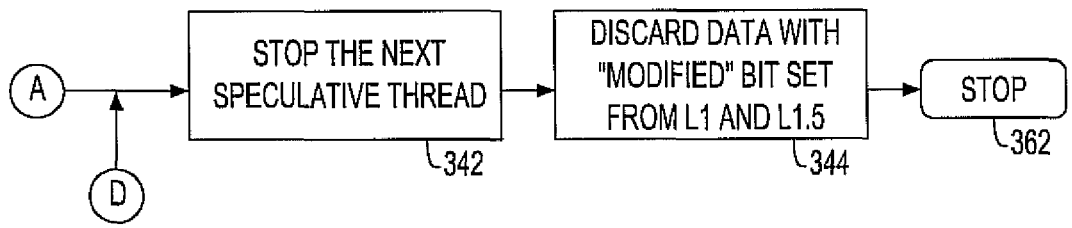
Figure 3D:
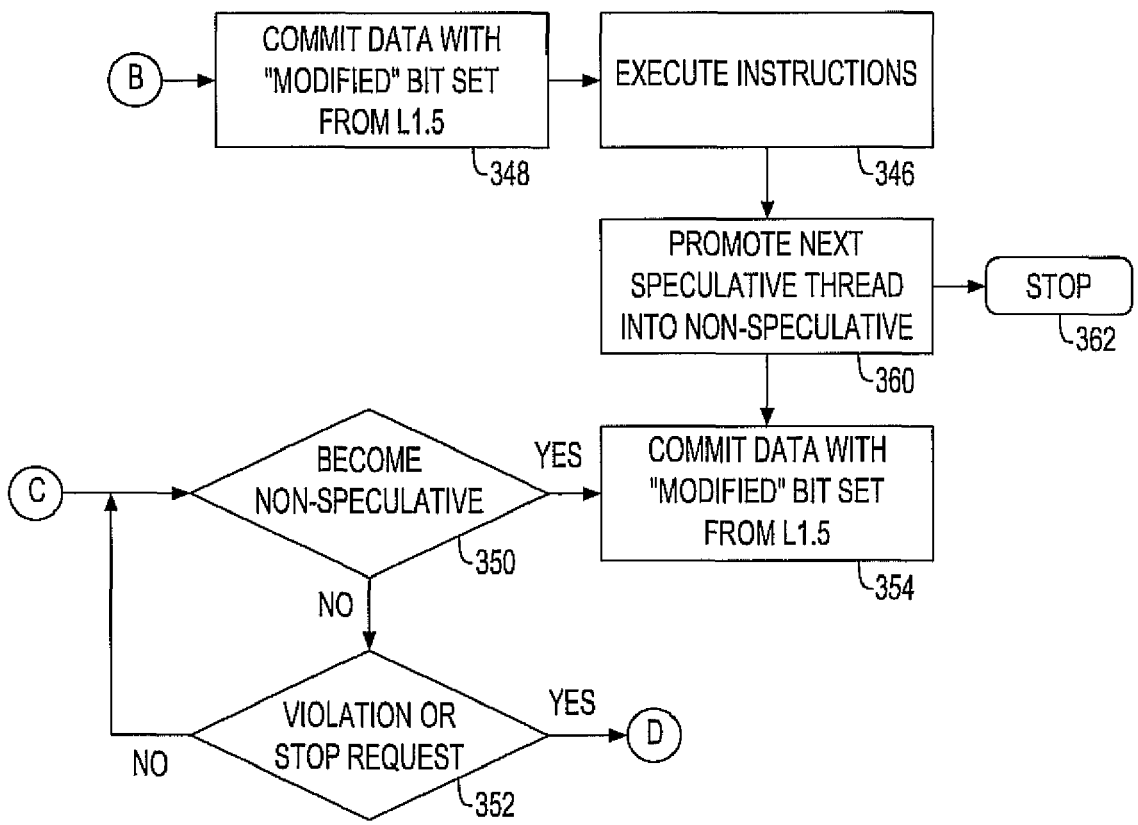

FIG. 2 shows the addition of the new cache level L1.5 between the data caches L1 and L2 levels to enable thread level speculation. That is, to each of the four processor cores 100-103 there is added a new cache level L1.5 200-203, respectively. The L1.5 cache is private and local to each processor, and is intended to store speculative results and status associated with that processor. This effectively implements memory renaming. The L1.5 cache is used only in the thread level speculation CMP mode with data being fed directly to and from L1.5 caches 200-203. For the speculation mode, the L1 cache coherency is replaced by coherency in L1.5 cache. In the symmetric multiprocessing mode (i.e., mode where no speculation is enabled) this L1.5 cache is bypassed. The bypassing for each processor 100-103 is achieved by selecting multiplexers 220-223 respectively, using SMP select signal 231, to completely bypass the L1.5 cache in the SMP mode. All four L1.5 caches 200-203 are interconnected by a dedicated bus 230 to enable data forwarding between parallel threads, to detect true dependency violation, and to implement cache coherency. Other embodiments may implement a crossbar switch device to interconnect the local L1.5 speculative caches in the system or some other interconnect means, without departing from the scope of the invention.

During operation in the thread level speculation (TLS) mode, processors 100-103 use both L1 110-113 and L1.5 200-203 caches. In this operation mode, the L1 cache is configured to be in write-through mode and the L1.5 cache in write-back mode. The L1.5 cache keeps all speculative data, and only after the thread becomes non-speculative, data from the L1.5 cache are committed to lower level caches. Thus, L2 cache and below contain always and only non-speculative data. Threads are assigned to processors in a manner as known in the art and apparent to skilled artisans, so that each processor knows if it is the non-speculative thread, and which processors run more and less speculative threads. For example, one possible implementation for achieving this is round-robin assignment of threads to processors, but other allocations are possible without departing from the scope of this invention.

In the TLS mode, the L1 cache is in write-through mode, thus all writes by the processor are forwarded to the L1.5 cache as well. The cache line is written in the processor's L1.5 cache, and a "modified" bit in a L1.5 cache register is set for that cache line. These data do not get committed to the L2 and lower hierarchical memory level until the thread gets promoted into the non-speculative thread.

Those skilled in the art will understand that this invention may be practiced in a variety of forms, and that the number of processors, cache sizes, the provision of a single cache level above a TLS-enabled cache level, and the provisioning of a private per-processor cache below the TLS-enabled are exemplary in nature. Those skilled in the art will also understand that the logic resources of an L1.5 cache may be reconfigured to serve another purpose, such as, including but not limited to, a write-back buffer, a recorder structure to record memory traffic for at least one of program debugging and program profiling, and so forth.

FIGS. 3(*a*)-3(*d*) illustrate a flow chart depicting the flow control 300 for starting, executing, status changing and stopping of the threads in the embodiment of the invention depicted in FIG. 2. As shown, the flow control 300 depicts how a first thread from a sequential program is started, executed, stopped, and how its status is changed. As shown in FIG. 3(*a*), the very first thread is always non-speculative. After the thread is started as indicated at step 310, an initialization routine is performed at step 312 such as register or memory arrays initialization, and the first speculative thread is started at step 314. After the speculative thread is started, the non-speculative thread continues executing instructions, as indicated at step 316, and after committing data at step 318, it promotes the next speculative thread (that is, the same thread it started in the step 314) into a non-speculative thread as indicated at step 320. Finally, it stops its execution at step 322.

FIG. 3(*b*) illustrates the flow control of all subsequent threads, which all start as speculative threads as indicated at step 330. Once a speculative thread is started, a determination is made at step 331 as to whether there is an available processor If there is an available processor, the process continues to step 332 where the next, more speculative thread is started, and the process continues with executing instructions as indicated at step 334. Otherwise, if it is determined at step 331 that no processor is available, then the process proceeds directly to step 334 where instructions are executed.

Continuing to step 336, a determination is made as to whether there is a dependency violation or stop request. If no dependency violation or stop request is detected at step 336, then the process proceeds to step 338 where a determination is made as to whether the thread has become non-speculative. Otherwise, if a dependency violation or stop request is detected at step 336, then the process proceeds to step 342 as will be described herein with respect to FIG. 3(*c*). Proceeding to step 338, if it is determined that the thread has become non-speculative, then the process proceeds to step 348 as will be described herein with respect to FIG. 3(*d*). Otherwise, if no dependency violation or stop request is detected at step 336, and the thread has not become non-speculative, the process proceeds to step 340 and a determination is made as to whether the all instructions have been completed. If all instructions have not been completed as determined at step 340, then the process continues executing instructions by returning to the process flow beginning at step 334. Otherwise, if the thread has made a determination that all instructions have been executed, then the process proceeds to step 350 as will be described herein with respect to FIG. 3(*d*).

Returning to step 336, if a dependency violation is detected, or if a stop request is received, the process proceeds to step 342, FIG. 3(*c*) where the thread stops the next speculative thread—which is the same threads it started at step 332. Then, all data with a "modified" bit set in cache L1 and cache L1.5 registers is discarded at step 344, and the thread stops its execution at step 362.

Returning to step 338, if the condition is detected that this speculative thread has become the non-speculative thread, the process proceeds to step 348, FIG. 3(*d*) where the thread first commits all data from the cache L1.5 with the "modified" bit set (348). Then, the thread continues to execute instructions at step 346. Once becoming the non-speculative thread and committing the modified data from the L1.5 cache, the cache L1.5 is basically not used anymore, as all results are committed directly to L2 and hierarchically lower memory levels. After data executing all instructions, it promotes the next speculative thread into the non-speculative thread as indicated at step 360 which is the same thread it started at step 332. Finally, the thread stops its execution at step 362, FIG. 3(*d*).

Returning to step 340, if it is determined that a speculative thread has reached the end of its instruction stream, it can not commit the data until it becomes the non-speculative thread. For this reason, it enters a wait state as indicated at step 350, FIG. 3(*d*), where it stays until either it becomes a non-speculative thread (as determined at step 350) or, until a dependency violation is detected or a stop request is received which condition is checked at step 352. If, at step 350, it is determined that the thread becomes the non-speculative thread, it commits the data from the L1.5 cache with "modified" bit set as indicated at step 354, and, promotes the next speculative thread into the non-speculative thread at step 360, and stops its execution in the step 362. Returning to step 352, if it is determined that a violation or a stop request has been received, the process proceeds to step 342, FIG. 3(c) where the thread stops the next speculative thread—which is the same threads it started at step 332. Then, all data with a "modified" bit set in cache L1 and cache L1.5 registers is discarded at step 344, and the thread stops its execution at step 362.

In one embodiment, the processor is a microprocessor core not cognizant of thread-level speculation. In at least one embodiment, this processor core includes at least one cache hierarchy level not cognizant of thread level speculation. In accordance with such an embodiment, the discarding step is implemented to remove speculative state updates from the at least one cache hierarchy level.

In one embodiment, a sequence of data cache block flush instructions is generated by the software component. In one embodiment a flash invalidate of the cache hierarchy is performed. In another embodiment, flash invalidate is implemented by a data cache block flush sequence with forced tag match, wherein at least one special mode bit overrides tag match logic to flush at least one cache entry regardless of cache match.

In one embodiment, the cache hierarchy level cognizant of thread-level speculation presents a sequence of cache requests to the processor core specifically directed at invalidating entries. In one embodiment, this encompasses requests corresponding to all data having been modified and being buffered in the cache hierarchy level cognizant of thread-level speculation.

In one embodiment, the cache level supporting thread-level speculation support provides and interface (such as a memory mapped I/O register, or a device control register DCR) to provide addresses of data elements to be invalidated.

In at least one embodiment, this interface is used by the software component to provide flushing of data from a private cache level.

In at least one embodiment, discarding is implemented with a loop testing whether entries are to be invalidated, retrieving an address of an entry to be invalidated, and invalidating the entry, as depicted in the following code sequence:
while (! dcr_read(TLS_CACHE_INVALIDATE_COMPLETE))
   dcbfl(dcr_read(TLS_CACHE_INVALIDATE_ADDRESS));

Those skilled in the art will understand that the code sequence given hereinabove is exemplary, and other like sequences can be implemented based on the teachings contained herein and within the scope of the present invention.

Figure 4:
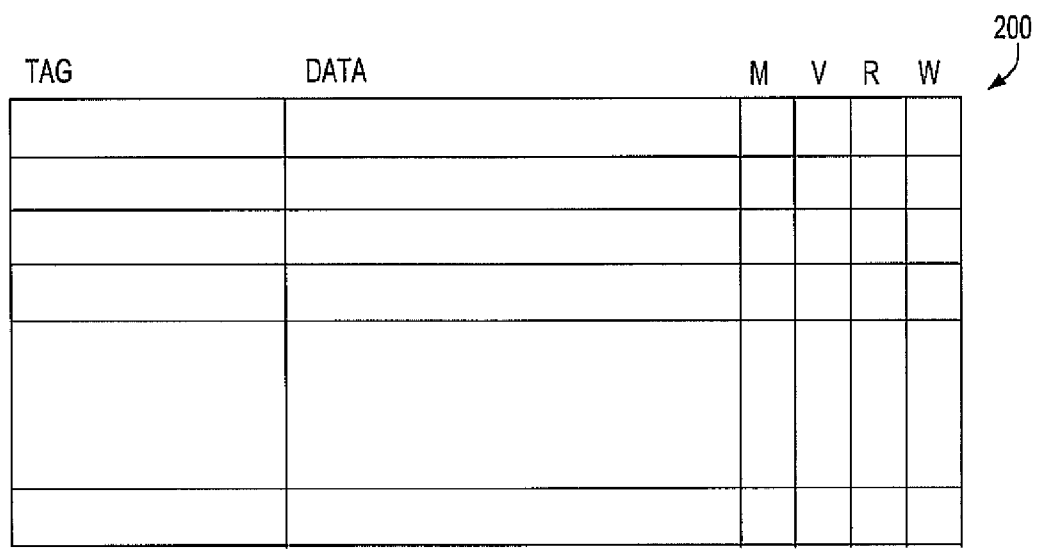
FIG. 4 illustrates the structure of the L1.5 cache according to the present invention.

FIG. 4 illustrates the structure of the L1.5 cache 200 according to the present invention. This cache comprises a number of cache lines with each line including an address tag field, a data field, and several special status bit fields, including a "modified" bit field (M) and a "valid" bit field (V). In addition to these fields typically found in every cache, there is assigned several more bits or bit groups to each line to keep record if a cache line was read, e.g., as indicated in a "read" bit field (R) or if a cache line was written to, e.g., as indicated in a "write" bit field by a thread.

Figure 5:
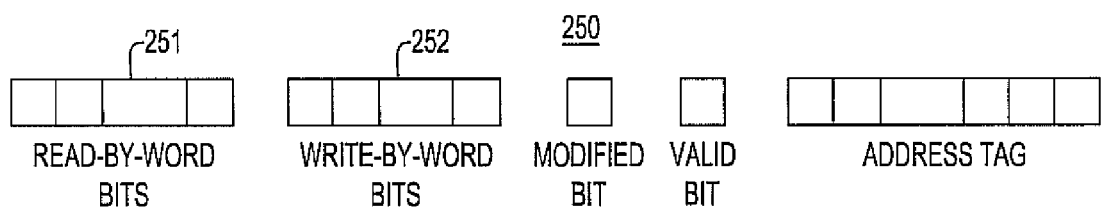
FIG. 5 illustrates the structure of the tag field for the L1.5 cache.

FIG. 5 is a detailed depiction of the tag field and status bits 250 of the L1.5 cache 200 in the preferred embodiment. In addition to the address tag, and "valid" and "modified" bits, which are typically present in any cache, the status bits tag also includes a set of "read-by-word" bits 251 and a set of "write-by-word" bits 252. One bit is present for each word, byte, double word, or any other desired granularity. Alternatively, only one bit can be used for the whole cache line. If a data word from the cache line is read by this thread, the corresponding bit in the "read-by-word" is set. Accordingly, the corresponding "write-by-word" bit is set if a word gets written by the thread. The information included in "read-by-word" bits (i.e., information if a word is read by the thread) is used to detect a Read-After-Write (RAW) dependency violation. The RAW violation occurs if a less speculative thread writes to an address that a more speculative thread has already read. In this case, the read occurred too early and the more speculative thread has used invalid data, i.e., the more speculative thread reads data before the less speculative thread had written data. This event is labeled a RAW violation. Information included in "write-by-word" bits (i.e., information if a word is written by the thread) is used to detect a Write-After-Write (WAW) dependency violation. The WAW violation occurs if a less speculative thread writes to an address that a more speculative thread has already written. The WAW violation does not cause stopping of the speculative thread and all subsequent (more speculative) threads, but it has to be detected to prevent overwriting of the results of the more speculative thread with results of the less speculative thread.

A "Valid" bit is set if a cache line contains valid data, and a "modified" bit is set if data from this cache line were written by the thread. In addition to this operation—which is the same as for the regular cache—the "modified" bit is also set if data are read by the thread having speculative status. This is to distinguish between speculative from non-speculative data—which is needed to know when removing speculative data from the cache L1.5 and L1 if a thread is stopped—as speculative data from less speculative threads could be forwarded to this cache on a load operation, as now described herein with respect to FIG. 6.

Figure 6:
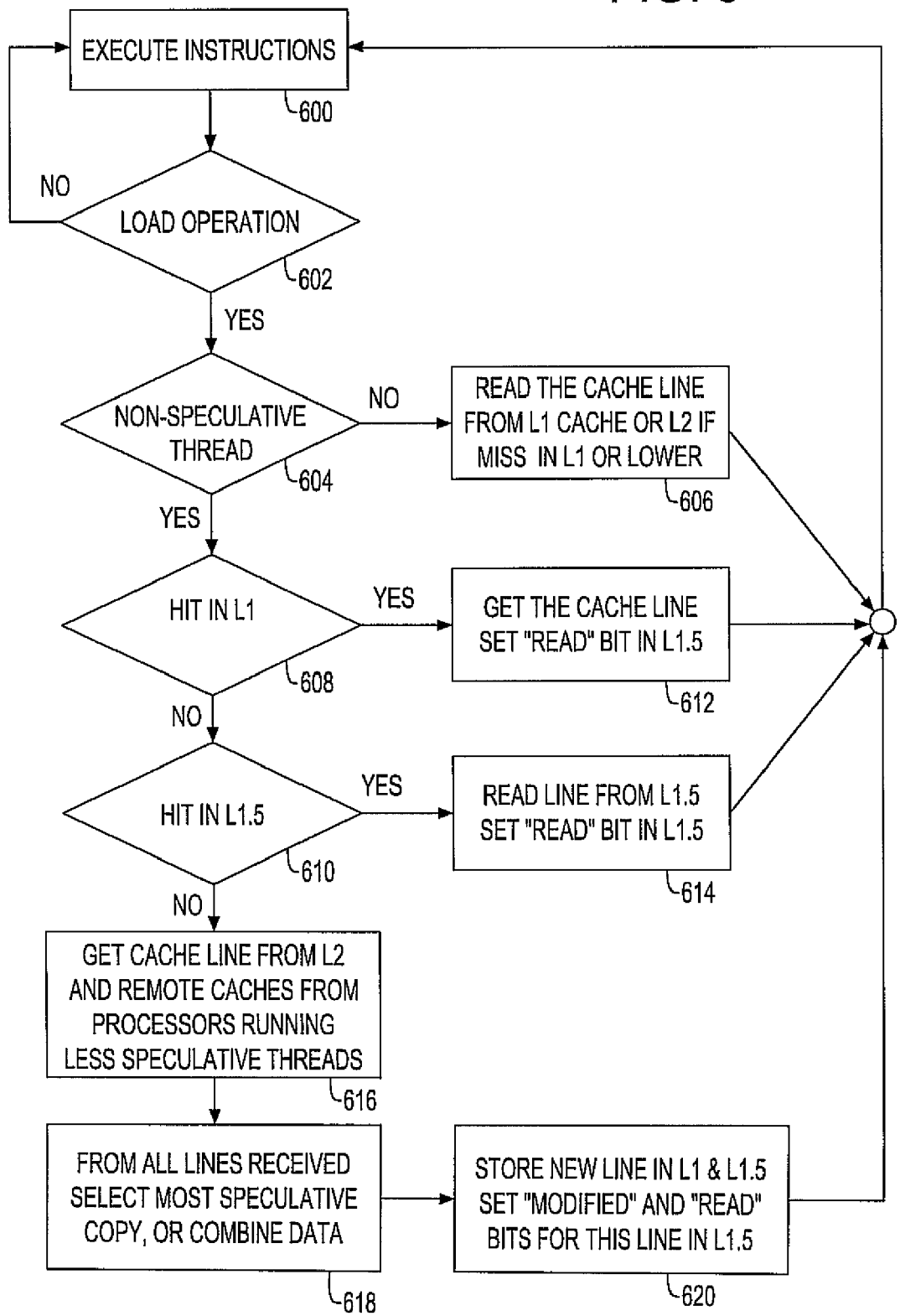
FIG. 6 illustrates a flow chart depicting a sequence of operations conducted for a load operation.

FIG. 6 illustrates sequence of operations on a load operation. If a load operation is detected as indicated at step 602, execution differs for non-speculative and speculative threads. Thus, for example, if the executed instruction is to perform a load operation, the process proceeds to step 604 to determine whether the requesting thread is a speculative thread. If at step 604, it is determined that the thread is a non-speculative thread, the process proceeds to step 606 where the operation does not differ from the typical sequence of operation, i.e., data are fetched from the L1 cache or from L2 cache if there is a L1 cache request miss, and if L2 request also misses, data are read from the L3, or from the main memory. After performing the read for the non-speculative thread, the process subsequently returns to execute the next instruction at step 600. Once the line is fetched, both the L1 and L1.5 caches get the new cache line. If at step 604, it is determined that the thread is a speculative thread, the process proceeds to step 608 where the L1 cache is first checked for the request. If the word is located in the L1 cache, the cache line data are fetched and the "read" bit for the corresponding line in L1.5 is set as indicated at step 612, and the thread continues its execution by returning to step 600. If, at step 608, it is determined that the read request misses in L1 cache, the process proceeds to step 610 where a determination is made whether the line is contained at the L1.5 cache level. On a hit in L1.5, the data are read as indicated at step 614 and the "read" bit for this line is set, and data are sent to the processor for continuing execution. The process subsequently returns to execute the next instruction at step 600. If at step 610, it is determined that there is a miss in the L1.5 cache, then the process continues to step 616 where the thread gets a copy from the L2 cache (or from the L3 cache or main memory if L2 cache misses) and speculative copies from remote caches from processors running less speculative threads than the requesting thread. Then, as indicated at step 618, the copies from speculative threads and from the L2 cache may be combined data byte-by-byte (or word-by-word), with the most speculative thread having the highest and L2 cache the lowest priority. More simply, the copy from the most speculative thread is used as indicated at step 618. Other selection schemes can be used for selecting the propped data without departing from the scope of this invention. Proceeding next to step 620, the new cache line has its "modified" bit set, and both the L1 and L1.5 caches get the new cache line prior to returning to step 600. This scheme implements data forwarding from less speculative threads to more speculative threads. Thus, when a more speculative thread needs data and misses in the L1 cache, it will get the most recent data from less speculative thread, thus reducing the probability of using the stale non-speculative data from the memory. However, if the thread is stopped at some point in time, than this cache line may contain speculative data and has to be removed from the cache.

Figure 7:
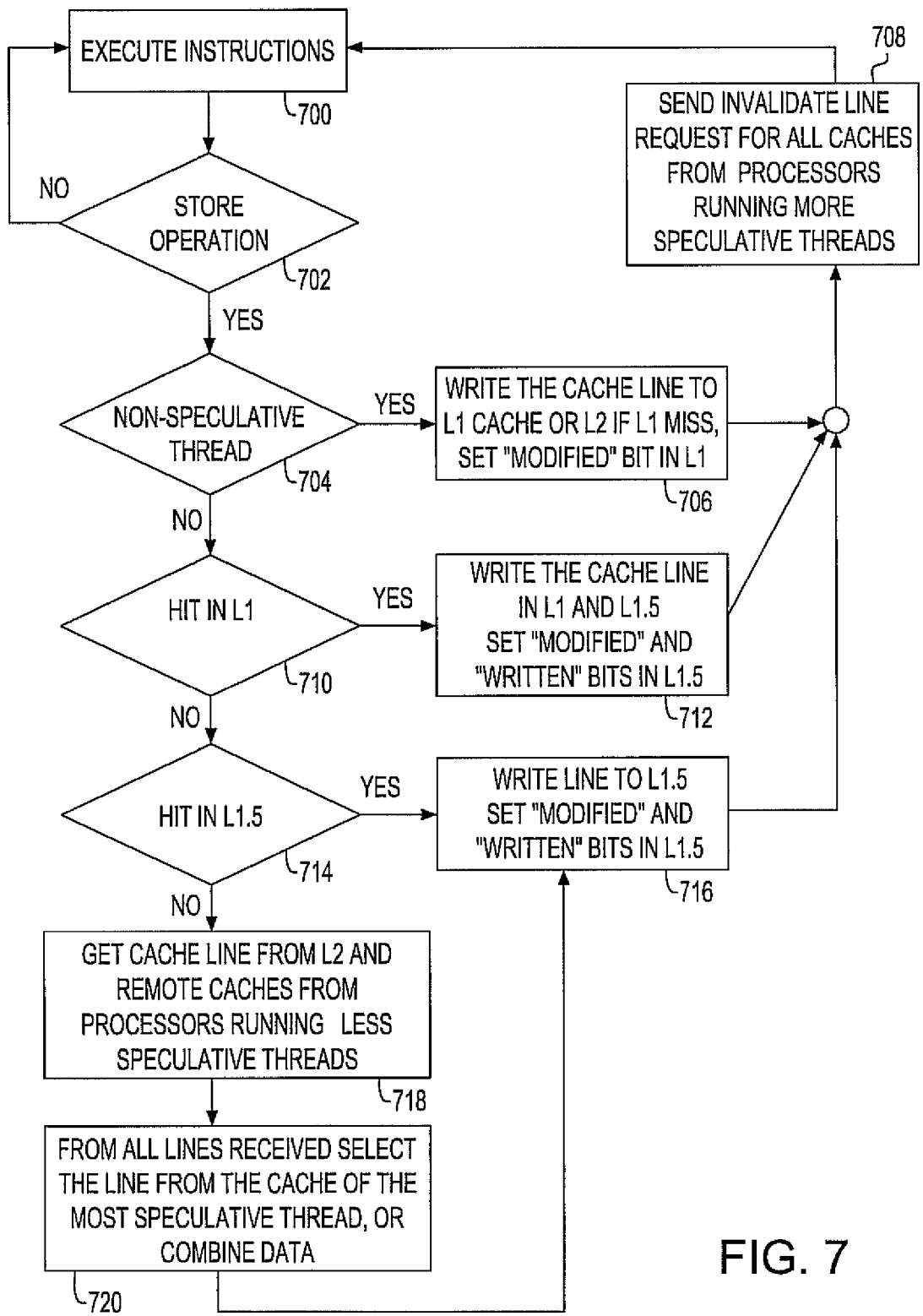
FIG. 7 illustrates a flow chart depicting a sequence of operations conducted for a store operation.

FIG. 7 illustrates the sequence of operations performed on a store operation. As shown at step 702, a determination is made as to whether the current instruction to be executed is a store operation. If a store operation is detected in the step 702, the process proceeds to step 704 where a determination is made as to whether the store execution is for a speculative versus non-speculative thread as the process differs for non-speculative and speculative threads. If the current store operation is for a non-speculative thread, then the process proceeds to step 706 where the non-speculative data can be written to the L1 cache, or to the L2 cache if L1 cache misses, and to the hierarchically lower memory levels 706. If the cache line is located in the L1 or L2 cache, data are written, and the "modified" bit is set. Afterward the process proceeds to step 708 where an invalidate request for this address is sent to all processors running more speculative threads, and the thread continues execution of the next instruction as shown at step 700. Returning to step 704, if it is determined that the store operation is for a speculative thread, the process proceeds to step 710 where a determination is made as to whether the word is found in the L1 cache level. If the word is located in the L1 cache (a L1 cache hit), then the process proceeds to step 712 where the data are written to L1 cache line and, in parallel, is written to the L1.5 cache line as indicated at step 712 and the bits "written" and "modified" are set at those cache lines. Afterward, the process proceeds to step 708 where the invalidate request for this address is sent to all processors running more speculative threads, and the thread continues its execution. Otherwise, returning to step 710, if it is determined that the write request misses the L1 cache, the process proceeds to step 714 where a determination is made as to whether there is a hit, i.e., the line is included in the L1.5 cache. On a hit in L1.5, the data are written to the L1.5 cache and bits "written" and "modified" are set as indicated at step 716. Then, proceeding to step 708, the invalidate request for this address is sent to all processors running more speculative threads, and the thread continues its execution. Returning to step 714, on a miss in L1.5 cache, the process proceeds to step 718 where the speculative thread gets a copy from the L2 cache (or from the L3 cache or main memory if L2 misses), and receives speculative copies from remote caches from processors running less speculative threads than the requesting thread. These copies from speculative threads and from L2 cache can be combined data byte-by-byte (or word-by-word), with the most speculative thread having the highest priority and L2 cache the lowest priority, or simply the copy from the most speculative thread is used as indicated at step 720. Other selection schemes can be used for selecting the propped data without departing from the scope of this invention. Next, the process proceeds to step 716 where the data line is written to the L1.5 cache and bits "written" and "modified" are set. If the L1 cache has been configured in the "write-through with allocate on store" mode, then this data line is stored in the L1 cache with the "modified" bit set as well.

Figure 8:
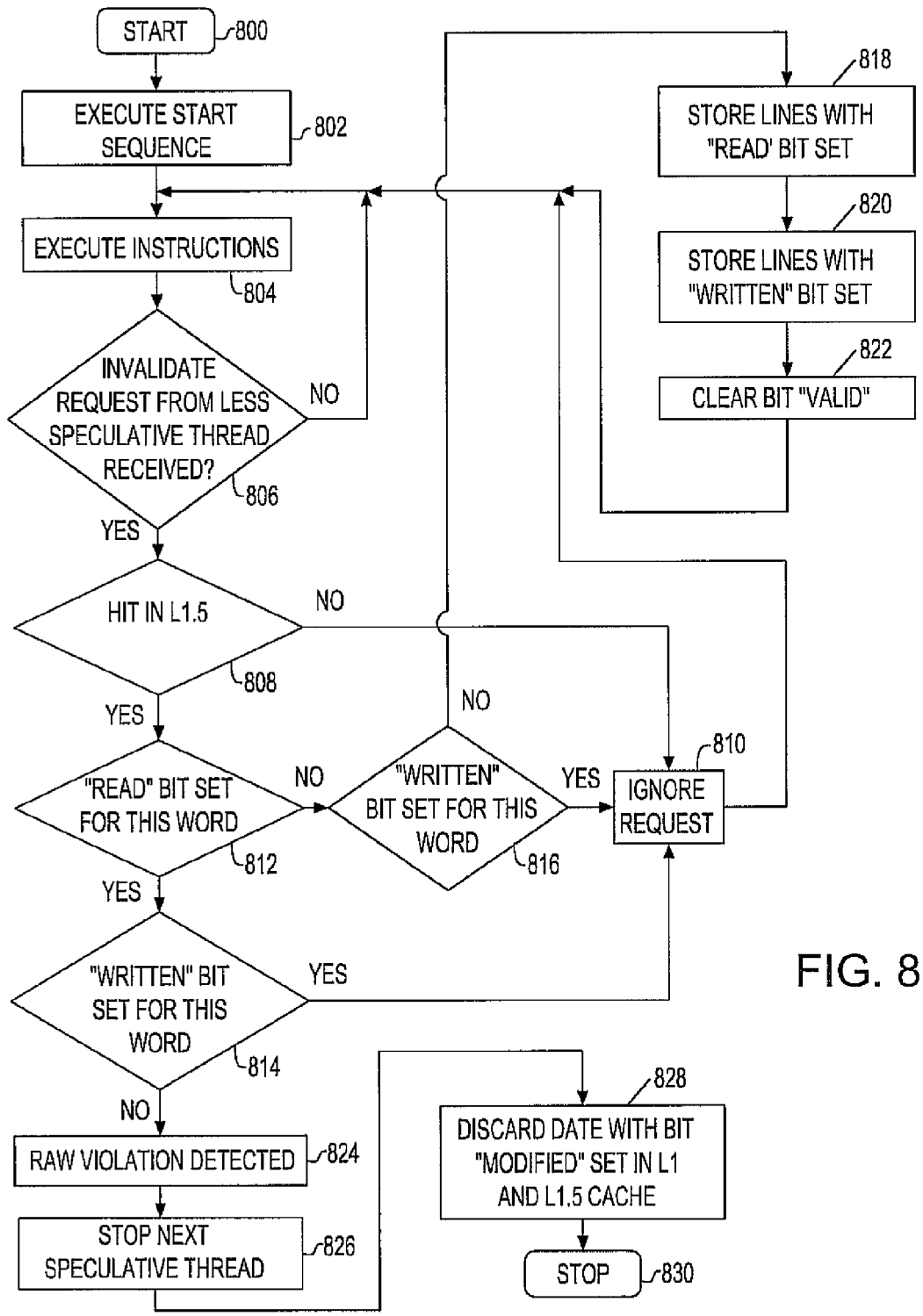
FIG. 8 illustrates a flow chart depicting the control flow for detecting true dependency violations according to the invention.

FIG. 8 illustrates a flow chart depicting the control flow 800 for detecting true dependency violations according to the invention. After the speculative thread has been started and a start sequence executed at step 802 (in the manner as described herein with respect to FIG. 3(*b*)), the thread executes an instruction sequence as indicated at step 804. With respect to an executing instruction, a determination is made at step 806 as to whether an invalidate request from the remote cache has been received from less speculative thread. If no remote cache invalidate request from the remote processor running a less speculative thread is received at step 806, the thread continues its execution at step 804. If however, at step 806, a write request from a remote cache having a processor running a less speculative thread is received, the request has to be checked to determine if this cache line hits in the L1.5 cache as determined at step 808. If the remote cache request misses in the L1.5 cache, this request is ignored as indicated at step 810, and the thread continues its normal execution at step 804. If, on the other hand, the remote cache request has hit in the L1.5 cache, a determination is made at step 812 as to whether the "read" bit has been set for that cache line, or whether a corresponding "read-by-word" bit of set 251 (see FIG. 5) has been set. If, at step 812, it is determined that this read bit is not set for this particular word, this means that this word was not read by the local thread, so no RAW violation has happened. Thus, the line has to be evicted from the L1.5 cache, unless it has already been written to by the local thread. Thus, the process proceeds to step 816 where a determination is made as to whether a "written" bit has been set for this cache line/word to avoid a WAW dependency violation. If the corresponding "write-by-word" bit of this cache line has been set, this means that the local, more speculative thread has already written results to this line. The control flow in this case returns to step 810 where the remote cache invalidate request is ignored, and the process continues to the instruction execution at the step 804. If however, the proper "write-by-word" bit had not been set, this cache line has to be evicted. However, it is the case that before a line in the L1.5 cache can be evicted, all addresses from the line with "read-by-word" bits have to be stored. Thus, continuing from step 816, the process proceeds to step 818 where the "read" addresses are stored. This is because all reads from a speculative thread have to be remembered, to be able to detect RAW dependency violation. To accomplish this, several approaches are possible. One approach is not to allow line eviction and to stall the processor until it either becomes the non-speculative thread, when it continues normal execution (as no RAW violations were detected), or until the local speculative thread gets a stop request from the less speculative thread. Another possible solution is to add a victim buffer where address read by the local thread from the evicted cache lines is stored until the thread is either stopped or it gets promoted into the non-speculative thread. Other approaches are also possible without departing from the scope of this invention. Similarly, if any "write-by-word" bit is associated with this cache line (other than from the address of the remote cache request), the address and the modified data can not be discarded. Thus, the local thread is either stalled until it gets non-speculative or, is stopped, or addresses and modified data for from those fields with the "written" bits set are stored in a store buffer as indicated at step 820. After this, the cache line is invalidated in the step 822, e.g., by setting the cache line's "valid" bit to zero (0), and the local thread continues its execution at step 804. It should be understood that by not using "read-by-word" bit granularity but rather, only one "read" bit per cache line, the same remote cache request could result in stopping the local thread, even if the remote processor wrote to the different word from the word read by the local processor for both words located in the same cache line.

Returning to the step 812, FIG. 8, if it is determined that the "read" bit has been set for this word, then the process proceeds to next step 814, where a determination is made as to whether the "written" bit has been set for the cache line to avoid WAW dependency violation. If the corresponding "write-by-word" bit of this cache line has been set, this means that the local, more speculative thread has already written results to this line. Thus, if "write-by-word" bit has been set, then the control flow proceeds to step 810 where the remote cache invalidate request is ignored, and the process continues with the instruction execution at step 804. If, the corresponding "read-by-word" bit is set (at step 812) and the proper "write-by-word" bit is not set (as determined at step 814), then a RAW violation is detected as indicated at step 824. A stop request is then sent to the next speculative thread to stop more speculative threads as indicated at step 826, and modified data from L1 and L1.5 caches are discarded as indicated at step 828. Finally, at step 830, the speculative thread stops its execution.

While there has been shown and described improved cache apparatus providing for the buffering speculative values (state buffering) and tracking of speculative accesses between multiple cores executing in a multi-core multithreading system, as taught in applicants' commonly-owned, co-pending U.S. patent application Ser. No. 11/351,829 entitled "Method and Apparatus for Low Complexity Architectural Support for Speculative Execution" the contents and disclosure of which is incorporated by reference as if fully set forth herein, support for speculative multithreading has been suggested without changing the processor core. Thus, the present invention is directed to a control system for speculative multithreading for starting threads, a novel notification system to report violations of thread sequential ordering rules, hardware primitives, such as custom queues to aid in multi-thread scheduling, used to communicate by the software component, and software utilizing the core-external hardware primitives to create, restart and kill threads in response to requests communicated using custom queues and notification mechanisms restarting speculative threads.

The fundamental operations of speculative multithreading are:
  Initiate the start of a thread on another processor core;
  Check whether dependencies have been violated by threads executing speculatively;
  Terminate and restart threads which have violated dependences, and discard state generate during the incorrect execution; and
  Commit the results of a thread which has completed execution successfully, after all previous threads have committed successfully.

Specifically, speculative execution covers two aspects: thread control, and state buffering. Thread control covers thread creation, thread initiation (thread dispatch), thread re-start, and commit, as well as making the processor ready to accept a new speculative thread. State buffering provides the capabilities to detect violations, indicate them to the thread control aspect, a means to discard speculatively generated state, or to commit such state when execution has been successful. In one implementation, a system may restrict speculative state to memory state, discarding updates to the register file and reloading the initial state of the register file from memory upon restart to reduce design complexity.

Figure 9:
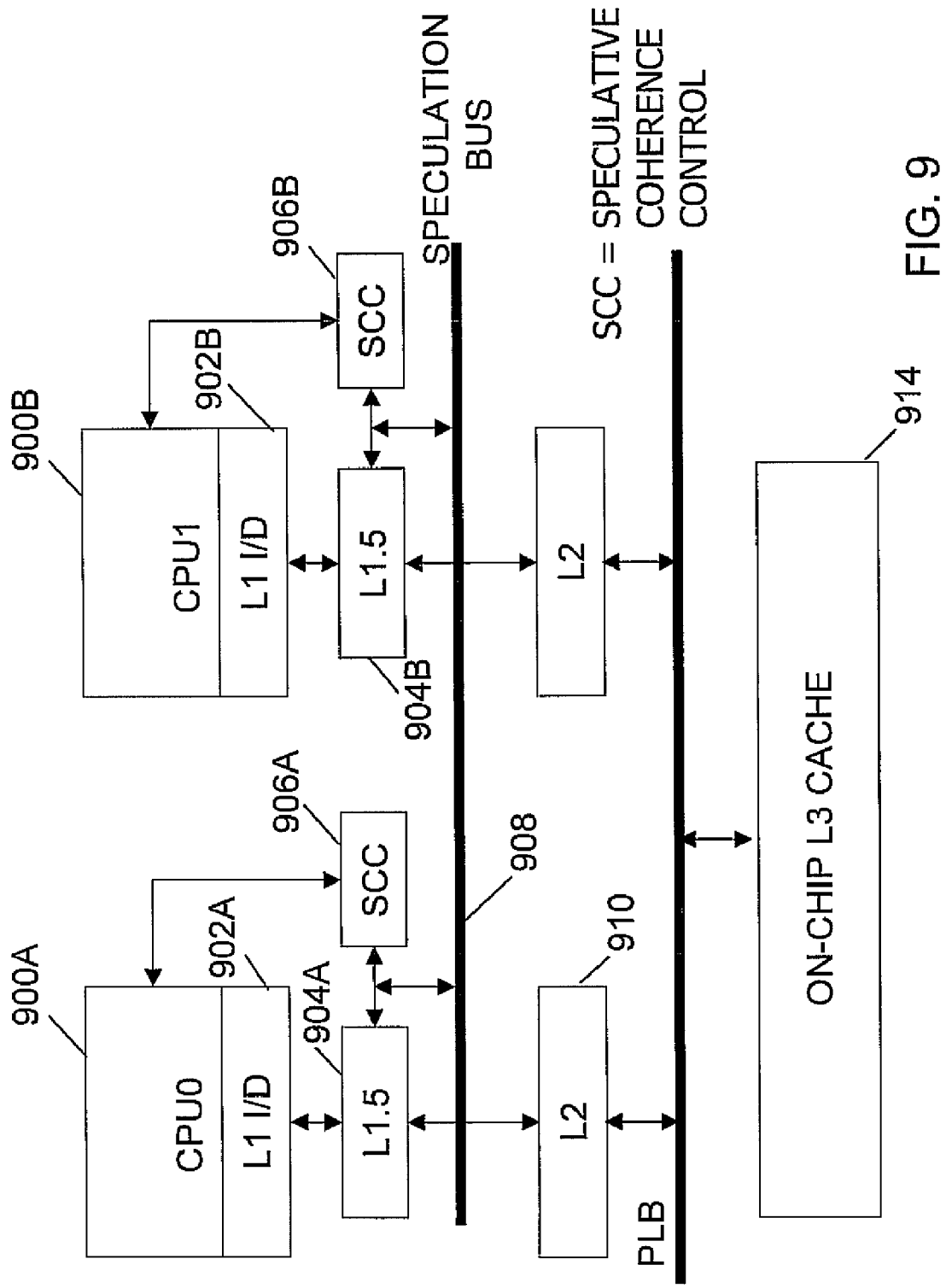
FIG. 9 illustrates a system in a speculatively multithreaded computer supporting at least two cores with a memory hierarchy designed to support coherence between speculative threads according to the invention.

FIG. 9 shows a system in a speculatively multithreaded computer supporting at least two cores with a memory hierarchy designed to support coherence between speculative threads. Specifically, the system consist of a first core 900a, containing a first level 1 instruction cache and a first level 1 data cache 902a, a L1.5 data cache 904a and a first speculative coherence control unit (SCC) 906a, generally implementing methods for TLS support described hereinabove. A second core 900b containing a first level 1 instruction cache and a first level 1 data cache 902b and linked to a second L1.5 data cache 904b and a second speculative coherence control unit 906b, generally implementing methods for TLS support described hereinabove, is provided. The first L1.5 data cache 904a and first speculative coherence control unit 906a implement speculative multithreaded coherence for the first processor 900a, and the second L1.5 data cache 904b and second speculative coherence control unit 906b implement speculative multithreaded coherence for the second processor 900b. The multithreaded speculation control apparatus of the first and second processors are operatively coupled via a speculation bus 908. L1.5 caches 904 are backed by a memory hierarchy, optionally consisting of a separate L2 910 and shared L3 cache 914 in an exemplary embodiment, or in another embodiment, a shared L2 cache and an optional L3 cache. Speculative multithreading can be implemented with a variety of instruction cache hierarchies, separate or joint with data caches. In one embodiment, the L1 instruction cache is backed by a second level instruction cache (not shown) and memory.

The SCC unit performs the following tasks for a processor in a speculatively multithreaded system in accordance with the present invention
  Identify when a new thread is being started, and initiate tracking of memory traffic for the new thread;
  Track cache lines maintained in L1 data caches, and identify whether a speculative thread has performed an access in violation of speculative multithread order;
  Identify if processor is executing the "head thread", i.e., a non-speculative thread, or one of one or more speculative threads;
  a Re-start one or more threads if a violation has been identified, ensuring correct use of input values for restarted thread;
  Commit results in-order when a thread has completed successfully; and
  Promote the next speculative thread into the "head" thread.

In one embodiment, a L1.5 cache method for state buffering is preferably used with the SCC unit of the present system. In another embodiment, another state buffering means is provided, having an appropriate interface as described hereinbelow.

The methods herein are preferably implemented as a hybrid of hardware and software, and implementations entirely in hardware and software can also be practiced in accordance with the teachings of the present invention.

In a preferred implementation, all speculative threads are created by calls to, and dispatched by, a speculative multithreading layer preferably implemented in software, and return control to the layer when execution is complete. In a preferred implementation, this multithreading software layer is implemented in "user" or "problem" state on a processor. In one embodiment, the processor is an IBM Power Architecture™ processor, although the present invention can be practiced in conjunction with other processor implementations, as anybody skilled in the art would appreciate.

According to the present invention, the multithreading software layer implements the following functions: Dispatch, Initiation, Re-start, and Commit, as described hereinbelow, and illustrated in FIG. 10.

Figure 10:
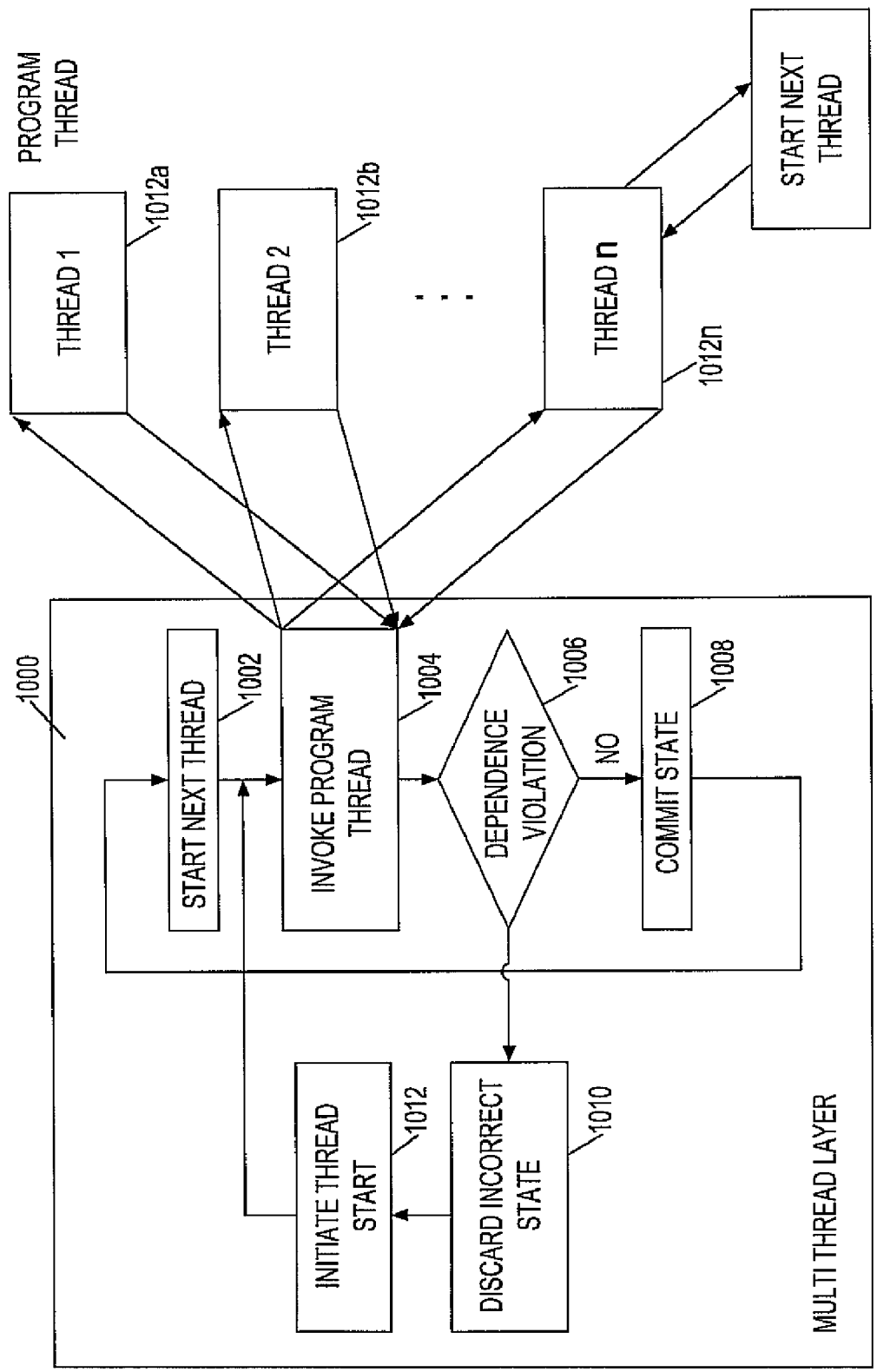
FIG. 10 shows the multithreading software layer and control flow within such layer performing the tasks of thread dispatch, initiation, re-start, and commit according to the invention.

Referring now to FIG. 10, there is shown the multithreading software layer 1000 and control flow within such layer performing the tasks of thread dispatch, initiation, re-start, and commit. In the preferred embodiment, only one thread 1012 runs on a single processor 900 in any time, but more threads 1012a to 1012n can run concurrently on any of the processors 900 without departing from the scope of this invention. When a program thread is available, control is passed to such thread in step 1002. Any thread 1012 in turn may create additional threads, by calling a thread creation interface and appropriately identify which of the precompiled threads to start in step 1004.

The condition if any thread has caused a dependence violation is checked in step 1006. If a thread has caused a dependence violation, its modifications to the local state are discarded in step 1010 and the thread is restarted in step 1012. Note that no modifications to the global state have been made, as all state modifications of a speculative thread are stored locally in a state buffer. In one embodiment, the state buffer is implemented as a L1.5 cache. In another embodiment, other methods for keeping a thread's speculative state are used.

In one embodiment, the multithreaded software layer keeps track of all successor threads 1012a to 1012n, and all successor threads 1012a to 1012n are re-started, by communication with instances of the multithread software layer. In another embodiment, the multithreaded software layer 1000 does not keep track of its successor threads, but instead it communicates its state that it is invalidating and its thread identifications via the speculation bus 908. All other processors 900 snoop on the speculation bus 908, and upon reception of the invalidation message, threads 1012 running on the same or the other processors 900 check for their status. If any thread 1012 recognizes that it is more speculative than the invalidated thread, it invalidates itself. This step of dependence violation checking is performed in step 1006, as described above.

Returning now to the step 1008, when no violation has occurred, the L1.5 state buffer 910 of the processor hosting the non-speculative thread which finished is signaled to commit to memory in accordance with the state buffer architecture, as described in applicants' commonly-owned, co-pending U.S. patent application Ser. No. 11/351,829, which is used in a preferred embodiment in conjunction with the present architecture. When state commit has successfully been performed in the step 1008, the control passes back to identify a next thread to be initiated in the step 1002.

Those skilled in the art will understand that a variety of methods can be used to implement specific steps depicted in FIG. 10. Thus, a dependence violation may be indicated from an SCC unit to the processor using a variety of notification events: in one embodiment, an interrupt interface may be used; in another embodiment, the SCC may set at least one status bit in at least one status register, said status register being accessible by one of an SPR register access, a DCR register access, a memory mapped I/O register access, an I/O space access, or any other method for accessing a data-holding location in accordance with the Power Architecture™ specification, or the specification of another processor.

In one embodiment, the violation indication may be checked continuously, such as using the external exception handling mechanism active in a microprocessor, intermittently, using polling in response to either a timer-triggered service function, or inserted by the compiler, or at the end of execution, before committing the state.

State is committed by the SCC and the associated L1.5 cache in response to an indication step performed by the software layer, using a variety of possible indication step implementations from the software layer. In one implementation of an indication step, at least one bit of one status register is written, said status register being accessible in a variety of ways in a variety of embodiments.

Buffered state is discarded by the SCC and the associated L1.5 cache in response to an indication step performed by the software layer, using a variety of possible indication step implementations from the software layer. In one implementation of an indication step, at least one bit of one status register is written, said status register being accessible in a variety of ways in a variety of embodiments. In one embodiment, discarding of state triggers the SCC to notify remote processors to restart their respective threads if they are younger than the present thread. In another embodiment, such remote thread notification is only generated in response to a separate request step, the request step being optionally implemented by at least one bit of one status register being written.

In a preferred embodiment, a remote SCC upon receipt of such notification, initiates a thread restart using one of the described notification events.

In another embodiment, software resident on each core notifies remote cores to restart younger threads by one of: generating an external exception, enqueuing a notification event in a inter-core communication channel such as a FIFO queue, setting at least one status bit in a status notification location, said notification location being implemented either in memory, or as a specially architected communication structure.

Thread restart may regenerate the start state using a variety of buffers holding the start state, such as buffers for storing invocation parameters and register contents, or a compiler may be equipped to generate threads in a manner not requiring state buffering by the software layer, e.g., by passing all parameters via a memory area.

In a preferred embodiment, the software layer executes in problem state, and threads are invoked using a subroutine call, or similar mechanism. In another embodiment, the software layer executes as part of privileged code, and threads are started by a context switch to user mode, the context switch indicating the start address of a thread to be executed.

In one embodiment, the software layer consists of a hybrid problem state and privileged state functions, with a variety of notification events being implemented as external exceptions, said external exceptions triggering transfer to an exception handler. In accordance with a preferred hybrid implementation, the privileged exception handler provides the notification event and, optionally, associated data, to non-privileged code portion implementing thread dispatch, commit and restart functions.

Figure 11:
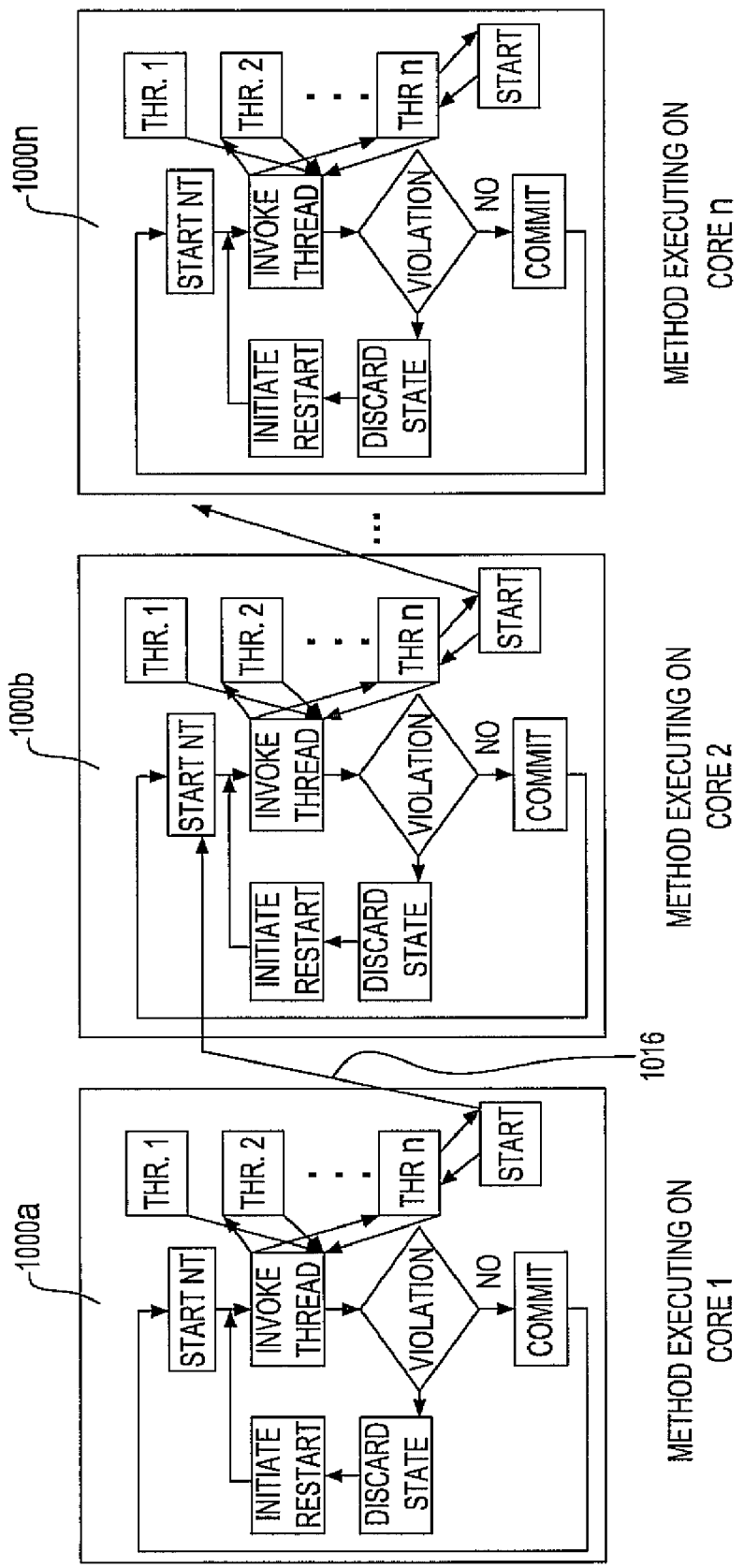
FIG. 11 illustrates the multithreaded software layer method executing on all processors participating in the speculative multithreading execution of a program according to the invention.

Referring now to FIG. 11, the multithreaded software layer method 1000a to 1000n is executing on all processors 900 participating in the speculative multithreading execution of a program, and collaboratively, the methods create the semblance of a unified program being executed at increased speed. The multithreaded software layer 1000 can be available in a system as a service included in the operating system or in the system libraries, or can be injected into executable programs by a compiler that also performs the thread partitioning.

Each thread running on a single processor can invoke one or more other threads on the same processor 1012a to 1012n, or it can invoke one or more threads 1016 on the other processors which participate in the speculative multithreading operation, as it is described here.

When a multithreaded software layer 1000 wants to dispatch execution of a younger thread 1012 on the same processor or 1016 on a remote processor, it invokes the thread dispatch interface specifying a thread identifier. In one embodiment, the thread is identified using an instruction address of a first instruction of the thread. In another embodiment, it is identified by a thread number, the software layer mapping the number to a function. The multithreaded software layer identifies a core, and en-queues thread execution to that core.

En-queuing can be performed in a variety of structures. In one embodiment, a software-controlled memory based structure such as queue or ring buffer is used. In another embodiment, hardware contains FIFO queues attached to a processor core via memory mapped registers, or the DCR interface, or another means. A means not requiring modification of the processor is preferable when retrofitting a legacy core which is to be reused unmodified in a speculatively multithreaded system.

The following three figures show various embodiments how the processors participating in speculative multithreading can be interconnected using dedicated FIFO queues hardware structures outside of the cores for work queues.

Figure 12:
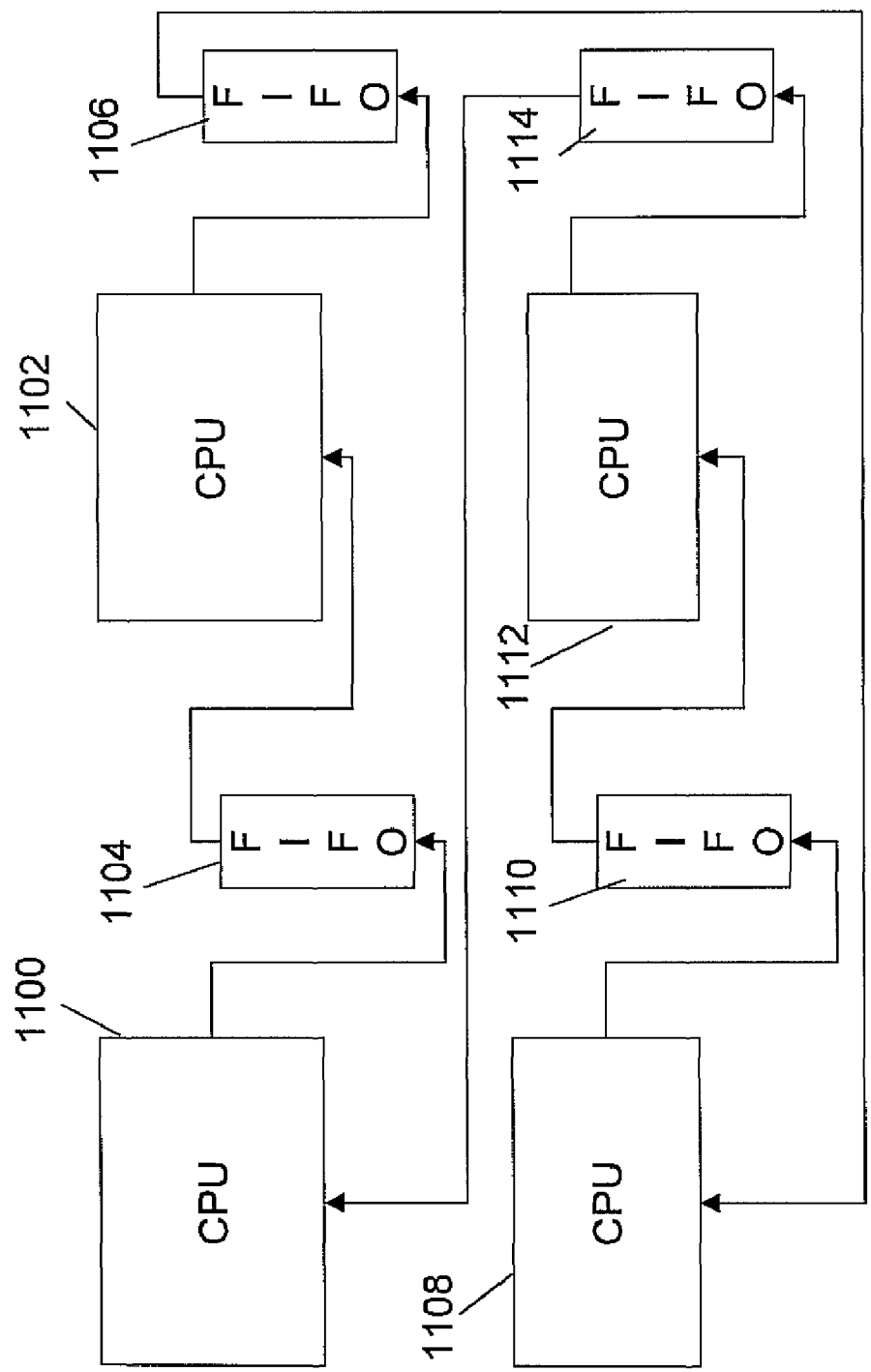
FIG. 12 illustrates the one-to-one FIFO queue interconnect for en-queuing start thread requests in the multiprocessor environment according to the invention.

Referring now to FIG. 12, a one-to-one FIFO queue interconnect is used. Each core can start a new thread only to the processors where he can deposit thread initiation request in the FIFO queue. In one-to-one FIFO queue interconnect, each core can en-queue new thread initiation request into only one FIFO queue associated to another processor. Also, there is exactly one processor which can initiate request for the new thread start by depositing a thread start request in the FIFO queue of the processor. In the illustrated embodiment, the processor 1100 can enqueue new thread start requests only to the FIFO queue 1104. The processor 1102 gets thread start requests from the FIFO queue 1104, and enqueues new thread start requests to the FIFO queue 1106. Similarly, the processors 1108 and 1112 can get start requests from the FIFO queues 1106 and 1110, respectively, and can en-queue requests to the FIFO queues 1110 and 1114, respectively.

Figure 13:
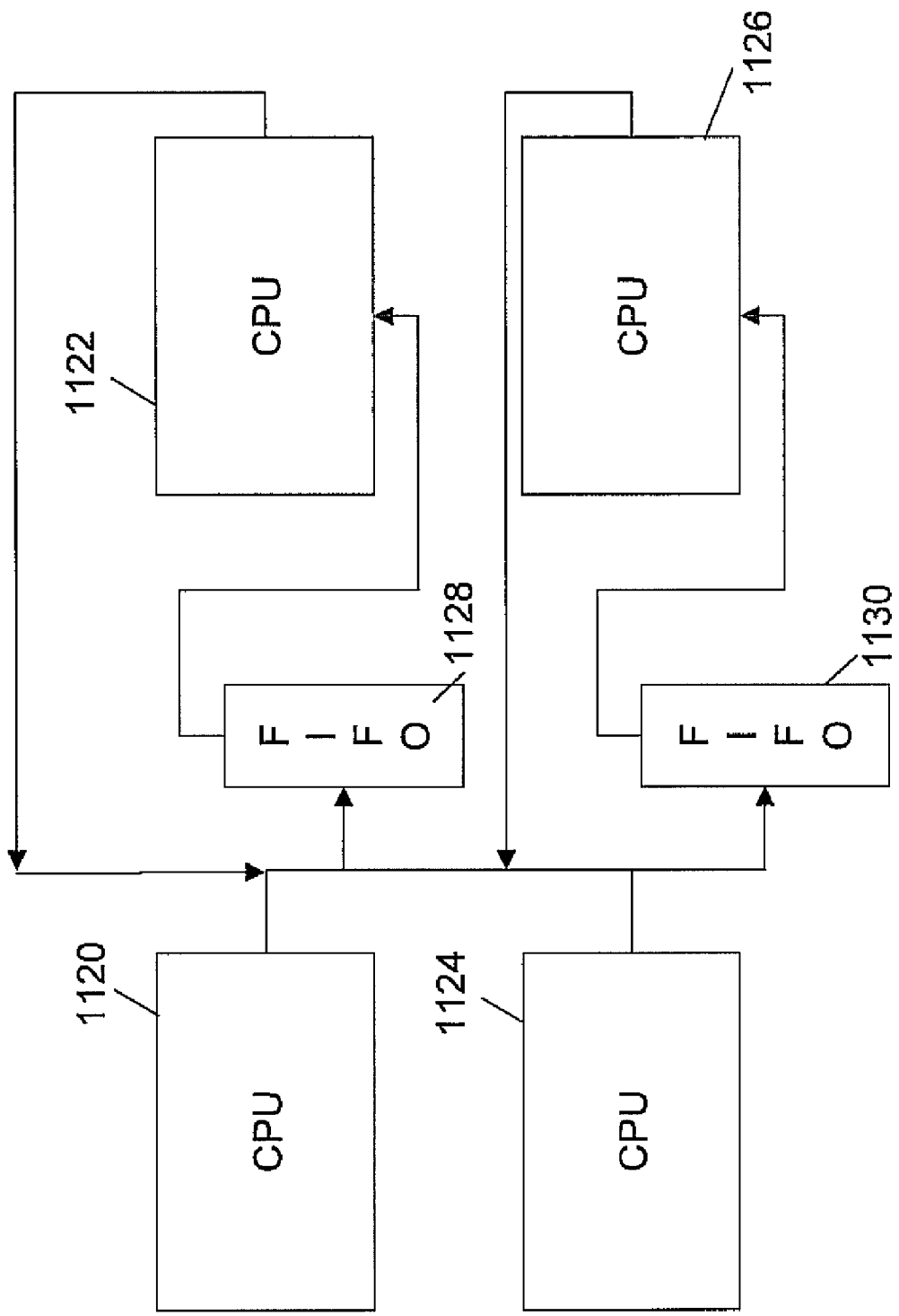
FIG. 13 illustrates the per-core FIFO queue for en-queuing start thread requests in the multiprocessor environment according to the invention.

FIG. 13 shows an alternative embodiment with per-core work queue. In this processor interconnect, each core has its dedicated work queue FIFO, and each processor can write to each other core's FIFO queue. Thus, the illustrated processor 1120 and 1124 can en-queue start thread requests to both FIFO queues 1128 and 1130 associated with the processors 1122 and 1126, respectively. This design requires more interconnections, but is also more flexible in thread scheduling.

Figure 14:
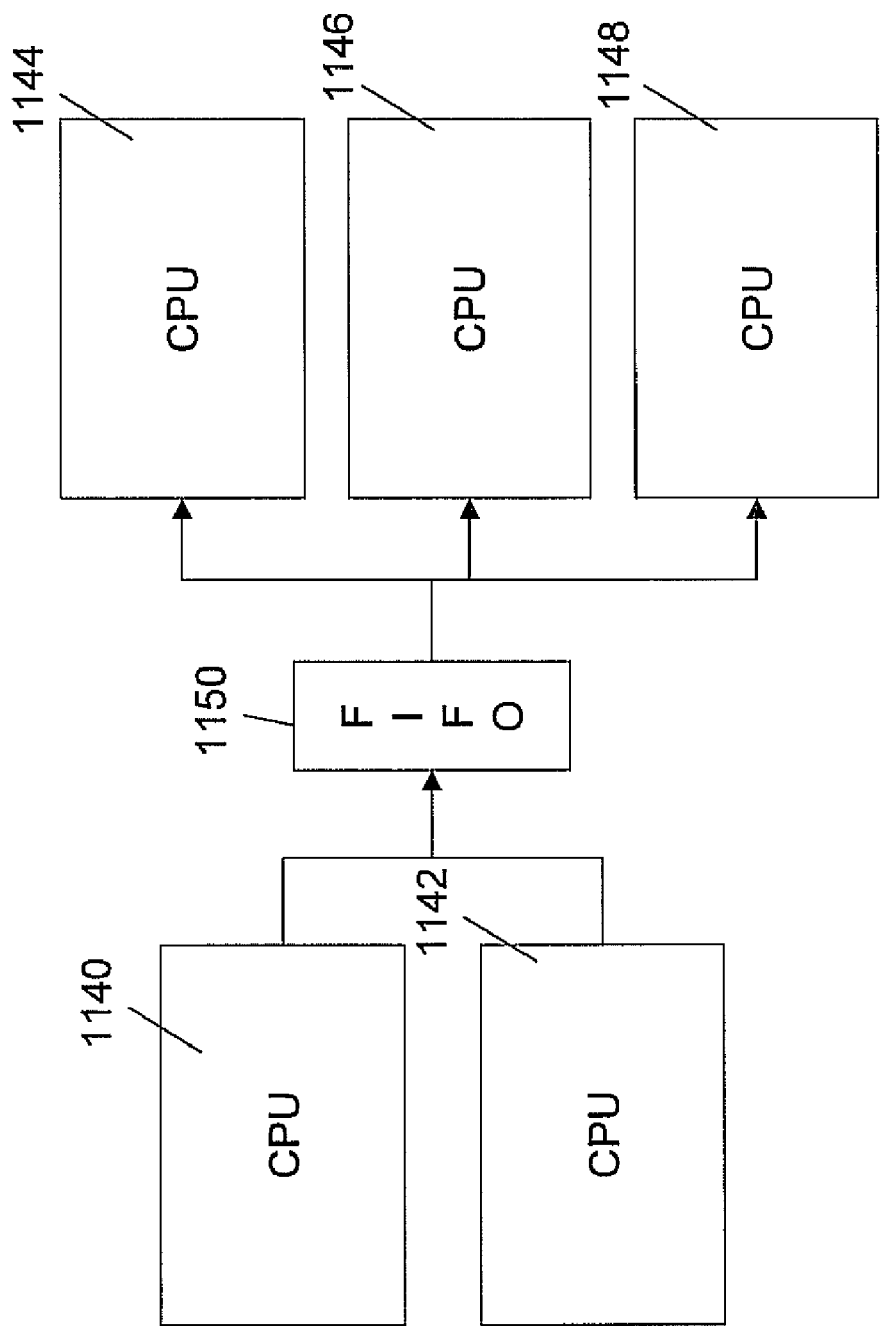
FIG. 14 illustrates the many-to-many central FIFO queue, where all cores deposit their thread initiations, and each core can pick up the next thread waiting according to the invention.

FIG. 14 illustrates yet another embodiment which has a central FIFO queue, where all cores deposit their thread initiations, and each core can pick up the next thread waiting. Thus, the processors 1140 and 1142 can en-queue start thread requests to the FIFO queue 1150. The processors 1144, 1146 and 1148 are getting the thread start requests from the FIFO queue 1150.

While these figures are shown as a first set of cores being the readers and a second set of cores being the writers to a FIFO queue, depending on the embodiment, a CPU will be both a reader and a writer to a FIFO queue. Thus in FIGS. 13 and 14, the readers of a FIFO queue may also be writers to other FIFO queues. Similarly, in some configurations a CPU may be a reader and a writer to the same queue, e.g., in FIG. 14, a single queue might be shared for reading and writing between all CPUs.

In another aspect of this embodiment, FIFO queues are shared by several readers and form a group or cohort where this group becomes a per-core-group work queue which might be written by all or some cores, but read only by a limited set of cores. This embodiment might be optimized for fast dequeing of requests with reduced overhead by reducing the number of read ports.

Now describing in more detail the dependence violation checking step 1006, when a thread has caused a dependence violation, its incorrect modifications to global state must be discarded and the thread must be restarted. Determination of such violation can be made using a variety of methods. In one embodiment, the SCC in conjunction with the L1.5 state buffer will raise an exception to the core, and said exception will be reflected to the multithreaded software layer. However, external exceptions are expensive, so this might incur overhead. In some implementations, threads may be very short, and the SCC may just set a global flag which is checked after completion of the user program instead of raising an exception immediately. However, since incorrect program execution due to violated dependences may cause a thread to halt, such implementation must support a timer which raises an exception if the thread does not complete within a predetermined timeout.

When a thread has completed, a check should preferably be performed by reading a status register in the SCC. This can be coupled via a non-cacheable memory mapped register, a DCR register in the embedded PowerPC architecture, an SPR readable by a microprocessor, a mailbox or other way of communicating between the SCC unit and the processor.

When a restart condition is detected, other threads may have to be restarted. In one embodiment, a compulsory restart occurs for all younger threads. In another embodiment, only threads which have read data from the present thread must be restarted.

In a preferred embodiment, the SCC is used to communicate a thread restart condition to the MLS on remote cores. In another embodiment, an exception is delivered directly to a remote core. In another embodiment, a software flag is set appropriately to cause the MLS layer to not commit speculatively executed results, but restart the thread when the MLS gains control.

Thread dependence information can be stored in the SCC unit, or maintained in software.

In one optimized embodiment, a commit signaling operation has a return code which indicates whether such commit was successful, or whether a dependence violation has occurred and such commit is not possible. This allows determination of dependence violation and a commit absent such condition to be performed with a single communication roundtrip between SCC and processor. This is advantageous, since in one embodiment, the SCC is located outside the processor core, to allow reuse of legacy processor cores in a speculatively multithreaded system.

In one embodiment, cores are allocated to threads in a round robin manner. In another embodiment, threads are allocated to cores when a core completes a previous task. (This embodiment requires threads to be able to retain several versions of state separately, and selectively flush certain state versions only, when a violation occurs.)

Parameters can be passed to a new thread via memory. In another embodiment they are stored in fast on-chip SRAM or eDRAM managed by software. In another embodiment, parameters are stored in the FIFO queue. In at least one implementation, this implementation choice limits the number of parameters (e.g., a few bytes of information only) due to the limited size of a FIFO queue. Alternatively, a FIFO queue can hold only a pointer to a parameter area, which can be located in memory, on-chip RAM, etc. In one embodiment, parameters are copied to local area, if the passing area is small (to free up space), or volatile (such as FIFO queue entries), so the parameters are still available when a thread restart becomes necessary.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for supporting thread level speculative execution in a computing environment having multiple processing units each adapted for concurrent execution of threads in speculative and non-speculative modes, each processing unit having a cache memory hierarchy of caches operatively connected therewith, the apparatus comprising:
    a means executing logic for managing said threads, said logic comprising:
    state buffering logic for tracking speculative accesses between multiple cores executing in a multi-core multi-threading system, and
    logic directed at tracking and establishing a sequence of operations for said speculative threads;
    a means for detecting speculative thread coherence violations at one or more processors and providing associated notifications; and
    wherein said thread managing means controls speculative thread activity at said one or more processors in response to said notifications.

2. The apparatus of claim 1 wherein the processing core corresponds to a CPU directed at single-threaded non-speculative execution, and wherein speculative thread support is provided by said cache memory hierarchy.

3. The apparatus as claimed in claim 1, further comprising:
    an additional cache level local to each said processing unit for use in a thread level speculation mode, each said additional cache for storing speculative results and status associated with its associated processor when handling speculative threads; and,
    means for interconnecting each said additional cache level for forwarding speculative values and control data between parallel executing threads.

4. The apparatus as claimed in claim 1, wherein said logic directed at tracking and establishing a sequence of operation comprises
    means for establishing the violation of sequence of operation and for providing notification of said violation via a notification sub-system.

5. The apparatus as claimed in claim 4, wherein said notification system comprises one or more status registers being polled by said thread managing means, and an exception being raised by said state buffering logic upon determination of a speculative thread coherence violation.

6. The apparatus as claimed in claim 1, wherein said managing means further comprises means for discarding a speculative cache state.

7. The apparatus as claimed in claim 6, wherein the speculative cache state in at least one cache hierarchy is discarded using a sequence of cache flush instructions.

8. The apparatus as claimed in claim 7, wherein speculative coherence violations are indicated from a thread managing means being executed on a first processing unit to at least one remote thread managing means at another processing unit.

9. The apparatus as claimed in claim 6, wherein said discarding is initiated in response to one of a local notification event indicating a speculative coherence violation, or a remote event indicating speculative coherence violation upon detecting that a present thread is younger than a violating thread.

10. The apparatus as claimed in claim 1, wherein a remote thread is initiated by providing a thread indicator to at least one remote thread managing means executing logic at another processor.

11. The apparatus as claimed in claim 10, further comprising at least one communication queue structure implementing efficient on-chip interconnection between at least two processors, the thread indicator being provided to said remote thread managing means using said at least one communication queue structure.

12. The apparatus as claimed in claim 11 wherein said communication queue structure is accessed using one of: memory-mapped I/O requests and DCR requests.

13. The apparatus as claimed in claim 10, wherein the thread indicator includes one or more of: a start address, and a thread number to be mapped to a pre-established task.

14. A method for implementing a thread-level speculation system on a chip multiprocessor, comprising
    receiving a thread identifier;
    starting a thread in response to receiving a thread identifier;
    committing the results of speculative thread speculation to at least one private cache adapted to store speculative execution results when a speculative thread becomes non-speculative in response to a logic result indicating a non-violation condition as determined by a logic unit operatively coupled to said chip multiprocessor;
    aborting and discarding the results of speculative thread execution in response to notification that a data dependence violation has occurred in one of: a present thread and an older thread in response to a logic result indicating a data dependence violation condition as determined by said logic unit;
    restarting thread execution when a thread has been aborted; and
    optionally starting at least a more speculative thread relative to a present thread state.

15. The method as claimed in claim 14, further including implementing logic for performing one or more of:
    identifying a start of a new speculative thread;
    tracking state information including speculative memory state associated with said new speculative thread; and
    storing speculative memory state information associated with said new speculative thread in a dedicated local cache level.

16. The method as claimed in claim 15, further including implementing logic for performing one or more of:
    causing threads more speculative with respect to the present state to be restarted;
    discarding processor state under control of a programmed means for managing said threads; and
    discarding speculative memory state.

17. The method of claim 16, wherein a notification event is received in a status register, said method further including: implementing logic for polling said status register and generating an exception event.

18. The method of claim 14, further comprising the steps of
    promoting a next speculative thread at a chip multiprocessing core into a non-speculative thread; and, committing results to a lower memory level in said hierarchy when a speculative thread has become non-speculative, and initiating a new speculative thread processing request.

19. The method as claimed in claim 14, wherein a processor performs:

dispatching execution of an identified thread to a same chip multiprocessing core or, to a remote chip multiprocessing core; and, enqueueing identified dispatched threads to be executed at that processing core.

* * * * *